United States Patent
Umehara

(10) Patent No.: US 10,186,148 B2
(45) Date of Patent: Jan. 22, 2019

(54) ROADSIDE CONTROL APPARATUS, COMPUTER PROGRAM, AND INFORMATION PROCESSING METHOD

(71) Applicant: SUMITOMO ELECTRIC INDUSTRIES, LTD., Osaka-shi, Osaka (JP)

(72) Inventor: Shigeki Umehara, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/531,868

(22) PCT Filed: Mar. 20, 2015

(86) PCT No.: PCT/JP2015/058492
§ 371 (c)(1),
(2) Date: May 31, 2017

(87) PCT Pub. No.: WO2016/098361
PCT Pub. Date: Jun. 23, 2016

(65) Prior Publication Data
US 2017/0270785 A1    Sep. 21, 2017

(30) Foreign Application Priority Data
Dec. 15, 2014   (JP) .................... 2014-252972

(51) Int. Cl.
*G08G 1/08* (2006.01)
*G08G 1/087* (2006.01)
(Continued)

(52) U.S. Cl.
CPC ............ *G08G 1/08* (2013.01); *G08G 1/012* (2013.01); *G08G 1/0112* (2013.01);
(Continued)

(58) Field of Classification Search
CPC ......... G08G 1/08; G08G 1/005; G08G 1/087; G08G 1/0145; G08G 1/13; G08G 1/166;
(Continued)

(56) References Cited

U.S. PATENT DOCUMENTS 6,326,903 B1 * 12/2001 Gross ................ G08G 1/087
340/902
6,339,383 B1    1/2002 Kobayashi et al.
(Continued)

FOREIGN PATENT DOCUMENTS

JP    2002-024989 A    1/2002
JP    2002-230686 A    8/2002
(Continued)

OTHER PUBLICATIONS

U.S. Appl. No. 15/535,553, filed Jun. 13, 2017, Shigeki Umehara.
(Continued)

*Primary Examiner* — Hung T Nguyen
(74) *Attorney, Agent, or Firm* — Drinker Biddle & Reath LLP

(57) ABSTRACT

The present invention relates to a roadside control apparatus 5 capable of wirelessly communicating with a mobile communication apparatus 42. This roadside control apparatus 5 includes: a receiving unit 51 configured to receive positional information of a mobile body (e.g., vehicle 43) equipped with the mobile communication apparatus 42, from the mobile body; a control unit 63 configured to analyze, on the basis of the received positional information, present states of at least one of signal control and road traffic at an intersection Jk, and generate output information based on a result of the analysis; and transmission units 51 to 53 configured to transmit the generated output information to external equipment.

13 Claims, 21 Drawing Sheets

[CALCULATION METHOD 2 IN SECOND CALCULATION PROCESS]

$\begin{cases} N_a : \text{NUMBER OF IN-ZONE EQUIPPED VEHICLES} \\ L_2 : \text{SECOND MEASUREMENT ZONE} \\ d : \text{AVERAGE SPACE HEADWAY} \end{cases}$

(51) Int. Cl.
  *G08G 1/01* (2006.01)
  *H04W 4/02* (2018.01)
  *H04W 8/00* (2009.01)
  *H04L 29/08* (2006.01)
  *H04W 4/44* (2018.01)

(52) U.S. Cl.
  CPC ......... *G08G 1/0133* (2013.01); *G08G 1/0145* (2013.01); *G08G 1/087* (2013.01); *H04L 67/00* (2013.01); *H04W 4/02* (2013.01); *H04W 4/44* (2018.02); *H04W 8/005* (2013.01)

(58) Field of Classification Search
  CPC ........ G08G 1/16; G08G 1/161; G08G 3/1016; H04W 4/02; H04W 4/027; H04W 8/005
  USPC ....... 340/906, 907, 917, 919, 932, 944, 916; 701/300, 301
  See application file for complete search history.

(56) References Cited

U.S. PATENT DOCUMENTS

| | | | |
|---|---|---|---|
| 2002/0116118 A1 | 8/2002 | Stallard et al. | |
| 2004/0145497 A1 | 7/2004 | Pearson | |
| 2004/0246144 A1* | 12/2004 | Siegel | G08G 1/087 340/902 |
| 2007/0040700 A1* | 2/2007 | Bachelder | G08G 1/087 340/902 |
| 2010/0153002 A1* | 6/2010 | Lee | G01C 21/3407 701/533 |
| 2011/0191011 A1 | 8/2011 | McBride et al. | |
| 2012/0033123 A1 | 2/2012 | Inoue et al. | |
| 2012/0188099 A1* | 7/2012 | Lee | G08G 1/087 340/906 |
| 2014/0372561 A1 | 12/2014 | Hisano | |
| 2015/0243165 A1* | 8/2015 | Elsheemy | B60R 25/00 340/906 |
| 2015/0269840 A1 | 9/2015 | Hirata | |
| 2016/0169688 A1* | 6/2016 | Kweon | G08G 1/087 701/522 |
| 2016/0171884 A1 | 6/2016 | Chen et al. | |
| 2017/0372148 A1 | 12/2017 | Chen et al. | |

FOREIGN PATENT DOCUMENTS

| | | |
|---|---|---|
| JP | 2003-187379 A | 7/2003 |
| JP | 2006-215977 A | 8/2006 |
| JP | 2009-048406 A | 3/2009 |
| JP | 2009-69907 A | 4/2009 |
| JP | 2009-140110 A | 6/2009 |
| JP | 2010-250586 A | 11/2010 |
| JP | 2011-96146 A | 5/2011 |
| JP | 2011-159152 A | 8/2011 |
| JP | 2011-233027 A | 11/2011 |
| JP | 2012-155553 A | 8/2012 |
| JP | 2013-101571 A | 5/2013 |
| JP | 2013-175131 A | 9/2013 |
| JP | 2013-214225 A | 10/2013 |
| JP | 2014-032545 A | 2/2014 |
| JP | WO 2014-041826 A | 3/2014 |
| WO | WO-2012/086301 A1 | 6/2012 |

OTHER PUBLICATIONS

U.S. Office Action dated Mar. 21, 2018 that issued in U.S. Appl. No. 15/535,553.

U.S. Office Action dated Jul. 24, 2018 that issued in U.S. Appl. No. 15/535,553.

U.S. Notice of Allowance dated Nov. 15, 2018 that issued in U.S. Appl. No. 15/535,553.

* cited by examiner

FIG. 5

| CONTROL FUNCTION EXECUTABLE BY IEB | OUTPUT INFORMATION | DESTINATION |
|---|---|---|
| ANALYSIS OF SIGNAL CONTROL | | |
| SWITCHING BETWEEN INDEPENDENT CONTROL AND REMOTE CONTROL (FIG. 6) | EXECUTION REQUEST/CANCEL REQUEST | REMOTE CONTROL APPARATUS |
| GREEN INTERVAL ADJUSTMENT (FIG. 7) | GREEN INTERVAL EXTENSION COMMAND | TRAFFIC SIGNAL CONTROLLER/ REMOTE CONTROL APPARATUS |
| CONVOY PRIORITY CONTROL (FIG. 8) | GREEN INTERVAL EXTENSION COMMAND | TRAFFIC SIGNAL CONTROLLER |
| CONVOY DELIMITING CONTROL (FIG. 9 TO FIG. 13) | CONVOY DELIMITING COMMAND | ON-VEHICLE COMMUNICATION APPARATUS |
| ANALYSIS OF ROAD TRAFFIC | | |
| ON-VEHICLE APPARATUS MOUNTING RATE CALCULATION PROCESS (FIG. 14 TO FIG. 17) | ON-VEHICLE APPARATUS MOUNTING RATE | REMOTE CONTROL APPARATUS |
| IMPROVEMENT OF LOCAL ADAPTIVE CONTROL (FIG. 18) | EMULATED PULSE SIGNAL | TRAFFIC SIGNAL CONTROLLER |
| DETECTOR EMULATION (FIG. 19) | EMULATED PULSE SIGNAL | TRAFFIC SIGNAL CONTROLLER |
| DATA THINNING (FIG. 20) | NECESSARY INFORMATION OTHER THAN TARGET OF THINNING | REMOTE CONTROL APPARATUS |
| ADVERTISEMENT SELECTION CONTROL (FIG. 21) | SELECTED ADVERTISEMENT INFORMATION | ON-VEHICLE COMMUNICATION APPARATUS |

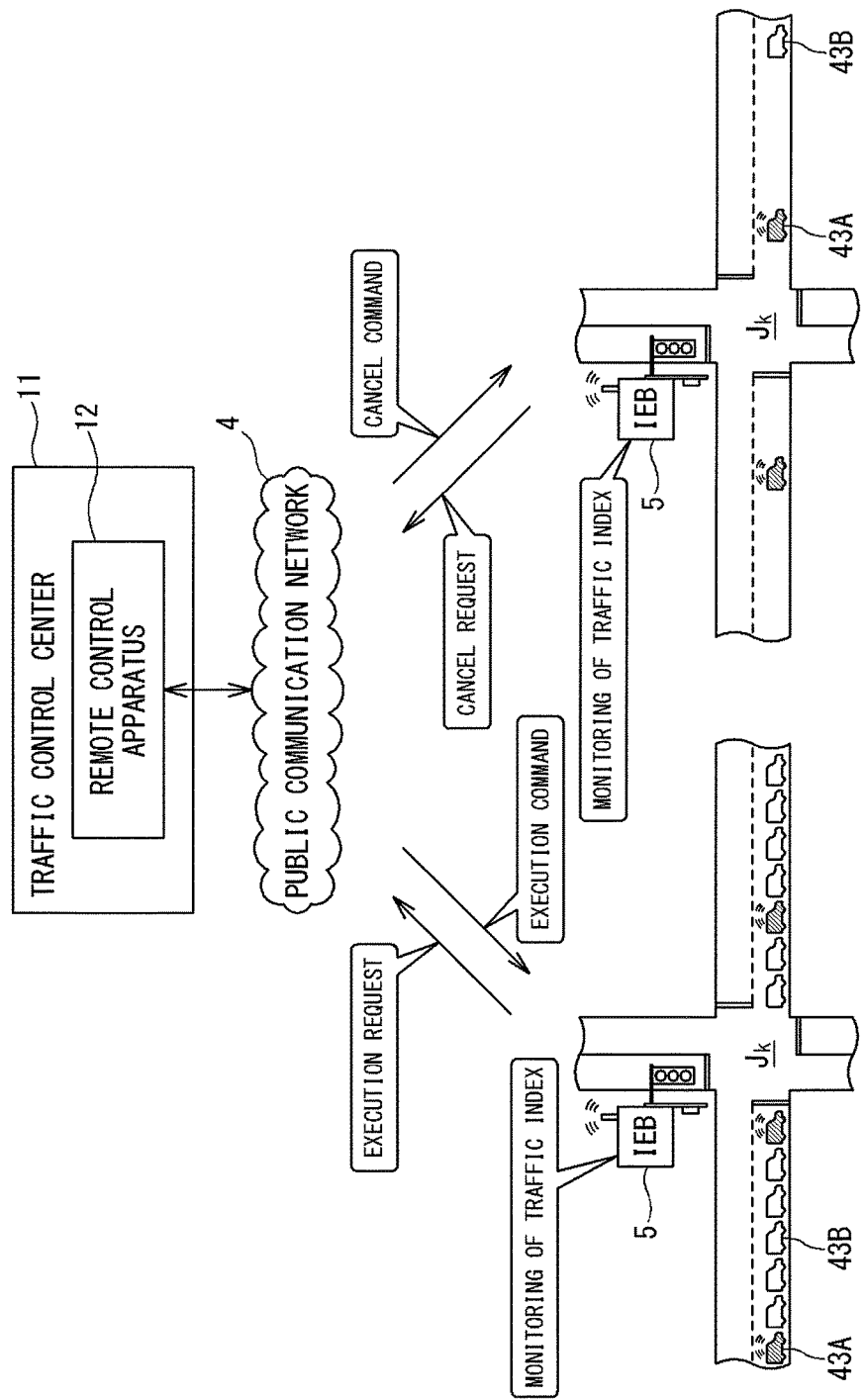

OUTLINE OF GREEN INTERVAL ADJUSTMENT

DETAILS OF GREEN INTERVAL ADJUSTMENT

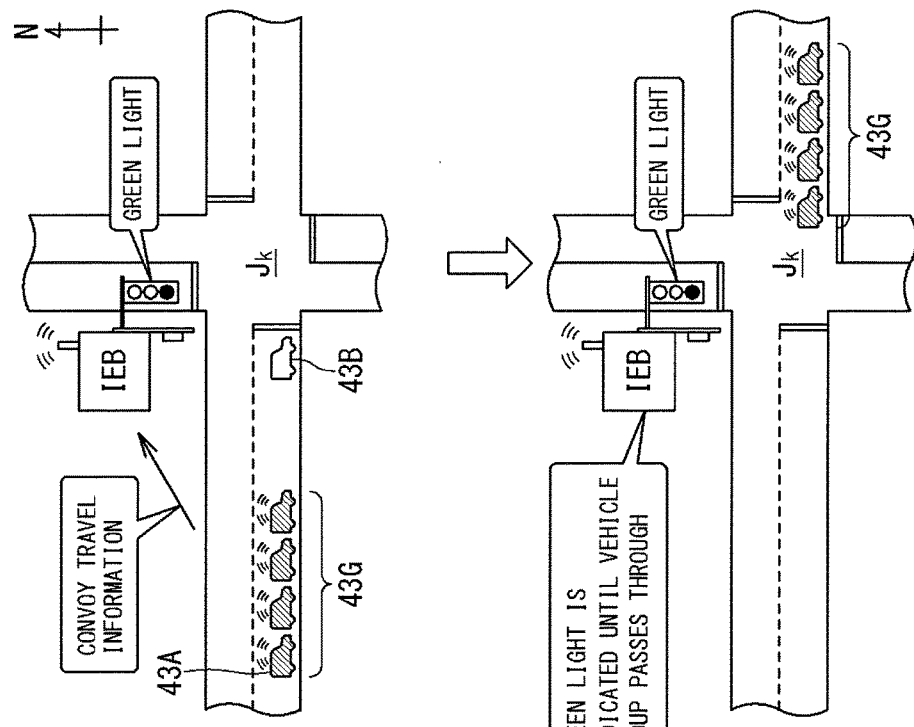
FIG. 8(a) NECESSITY OF CONVOY PRIORITY CONTROL
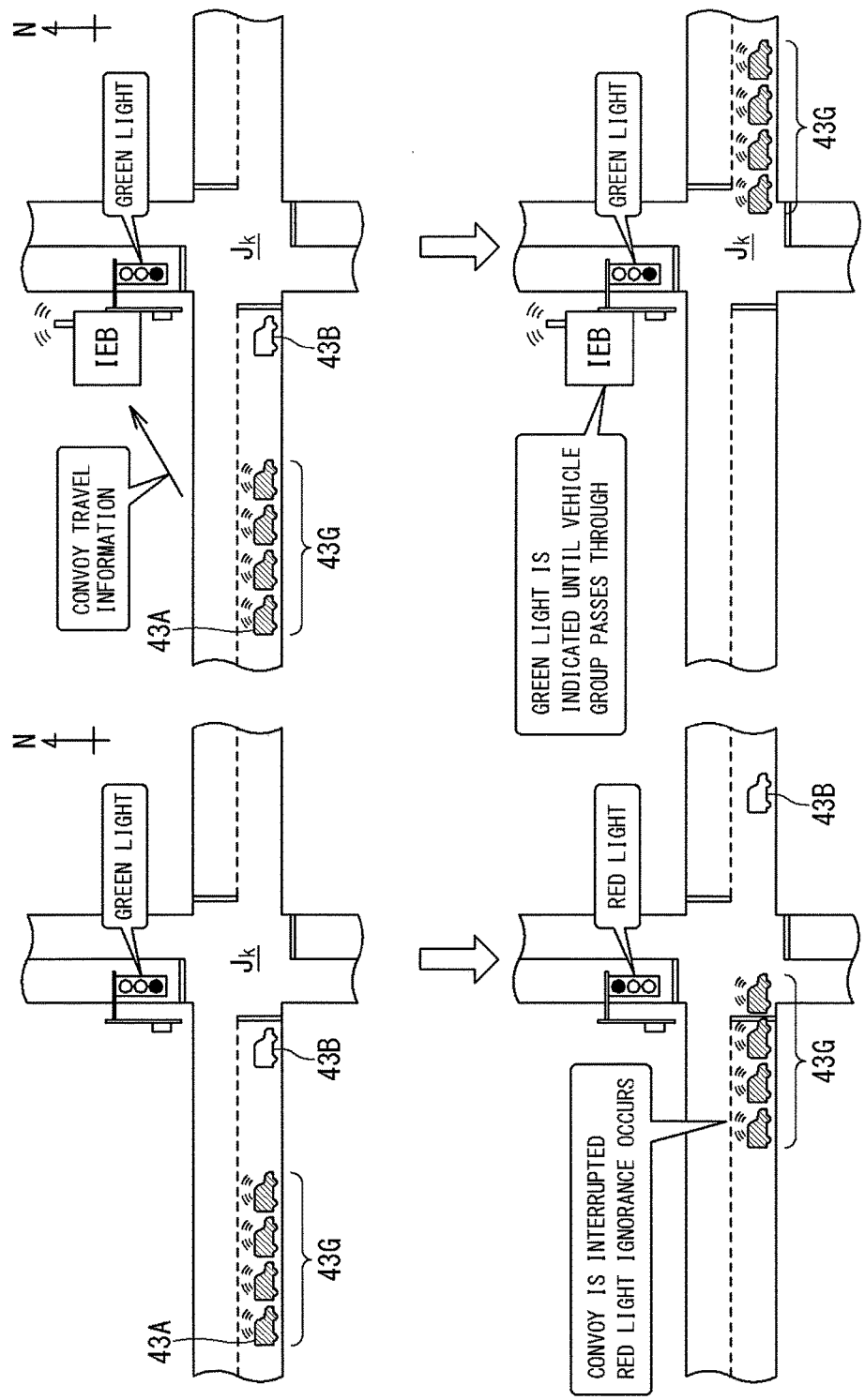
FIG. 8(b) OUTLINE OF CONVOY PRIORITY CONTROL

OUTLINE OF FIRST DELIMITING CONTROL

OUTLINE OF SECOND DELIMITING CONTROL

OUTLINE OF FIRST CALCULATION PROCESS

OUTLINE OF SECOND CALCULATION PROCESS

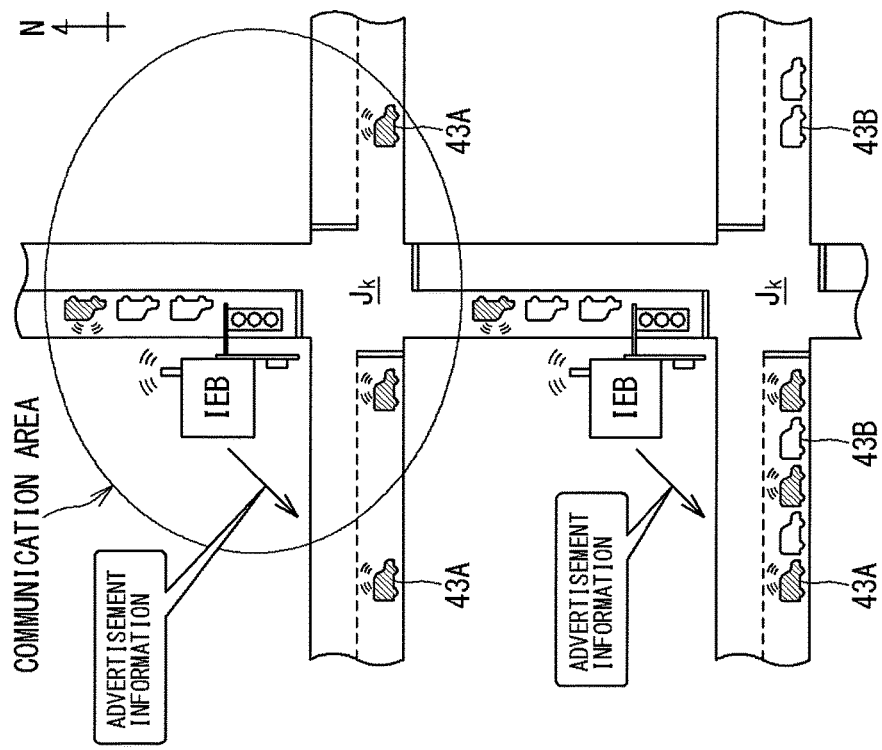
FIG. 21 (a) OUTLINE OF ADVERTISEMENT SELECTION CONTROL
FIG. 21 (b) ADVERTISEMENT INFORMATION MANAGEMENT TABLE

ROADSIDE CONTROL APPARATUS, COMPUTER PROGRAM, AND INFORMATION PROCESSING METHOD

TECHNICAL FIELD

The present invention relates to a roadside control apparatus, a computer program, and an information processing method.

More specifically, the present invention relates to a technique of expanding functions of a roadside control apparatus configured to perform a probe information relaying process and the like.

BACKGROUND ART

A traffic control system is composed of, for example, a central apparatus located in a traffic control center, and traffic signal controllers, vehicle detectors, information boards, traffic monitor terminals, etc. which communicate with the central apparatus via a dedicated communication line (refer to Patent Literature 1, for example).

In this traffic control system, a traffic index of a predetermined road section is calculated on the basis of, for example, detection signals from vehicle detectors installed at appropriate locations in an area to be controlled, and traffic-actuated control such as setting of optimum traffic light switching timings for a plurality of intersections is performed on the basis of the calculated traffic index.

Meanwhile, a technique is also proposed in which a roadside communication apparatus installed at an intersection receives probe information that is wirelessly transmitted/received in vehicle-to-vehicle communication, and relays the probe information to a central apparatus, whereby the probe information generated by vehicles can be used for traffic-actuated control performed by the central apparatus in a traffic control center (refer to Patent Literature 2, for example).

CITATION LIST

Patent Literature

PATENT LITERATURE 1: Japanese Laid-Open Patent Publication No. 2006-215977
PATENT LITERATURE 2: Japanese Laid-Open Patent Publication No. 2013-214225

SUMMARY OF INVENTION

Technical Problem

Generally, the conventional roadside communication apparatus is specialized to a function of relaying probe information received from on-vehicle communication apparatuses, and is not directly related to traffic-actuated control performed by a central apparatus and local-actuated control performed by a traffic signal controller.

Therefore, even if roadside communication apparatuses are newly installed at intersections in various regions, advanced information processing such as analysis of signal information is still managed by centralized management of the central apparatus in the traffic control center, and is not allowed to be executed autonomously and dispersively at the respective intersections in the various regions.

In view of the conventional problems, an object of the present invention is to provide a roadside control apparatus and the like capable of dispersively executing advanced information processing such as analysis of signal information at each intersection.

Solution to Problem (1) A roadside control apparatus according to one mode of the present invention is a roadside control apparatus capable of wirelessly communicating with a mobile communication apparatus, and includes: a receiving unit configured to receive, from the mobile communication apparatus, positional information of a mobile body equipped with the mobile communication apparatus; a control unit configured to analyze, on the basis of the received positional information, present states of at least one of signal control and road traffic at an intersection, and generate output information based on a result of the analysis; and a transmission unit configured to transmit the generated output information to external equipment.

(14) A computer program according to one mode of the present invention is a computer program for causing a computer to function as a roadside control apparatus capable of wirelessly communicating with a mobile communication apparatus, and includes: a step of causing a receiving unit of the roadside control apparatus to receive, from the mobile communication apparatus, positional information of a mobile body equipped with the mobile communication apparatus; a step of causing a control unit of the roadside control apparatus to analyze, on the basis of the received positional information, present states of at least one of signal control and road traffic at an intersection, and generate output information based on a result of the analysis; and a step of causing a transmission unit of the roadside control apparatus to transmit the generated output information to external equipment.

(15) A method according to one mode of the present invention is an information processing method executed by a roadside control apparatus capable of wirelessly communicating with a mobile communication apparatus, and includes: a step of causing a receiving unit of the roadside control apparatus to receive, from the mobile communication apparatus, positional information of a mobile body equipped with the mobile communication apparatus; a step of causing a control unit of the roadside control apparatus to analyze, on the basis of the received positional information, present states of at least one of signal control and road traffic at an intersection, and generate output information based on a result of the analysis; and a step of causing a transmission unit of the roadside control apparatus to transmit the generated output information to external equipment.

Advantageous Effects of Invention

According to the present invention, advanced information processing such as analysis of signal information can be dispersed to be executed at each of intersections.

BRIEF DESCRIPTION OF DRAWINGS

FIG. 5 is a table in which specific examples of control functions that can be executed by the roadside control apparatus are listed.

FIG. 6 is an explanatory diagram showing an outline of switching between independent control and remote control.

FIG. 8(a) is an explanatory diagram showing necessity of convoy priority control, and FIG. 8(b) is an explanatory diagram showing an outline of the convoy priority control.

FIG. 21(a) is an explanatory diagram showing an outline of advertisement selection control and FIG. 21(b) is an explanatory diagram showing an example of an advertisement information management table.

DESCRIPTION OF EMBODIMENTS

Summary of Embodiment of Present Invention

Figure 1:
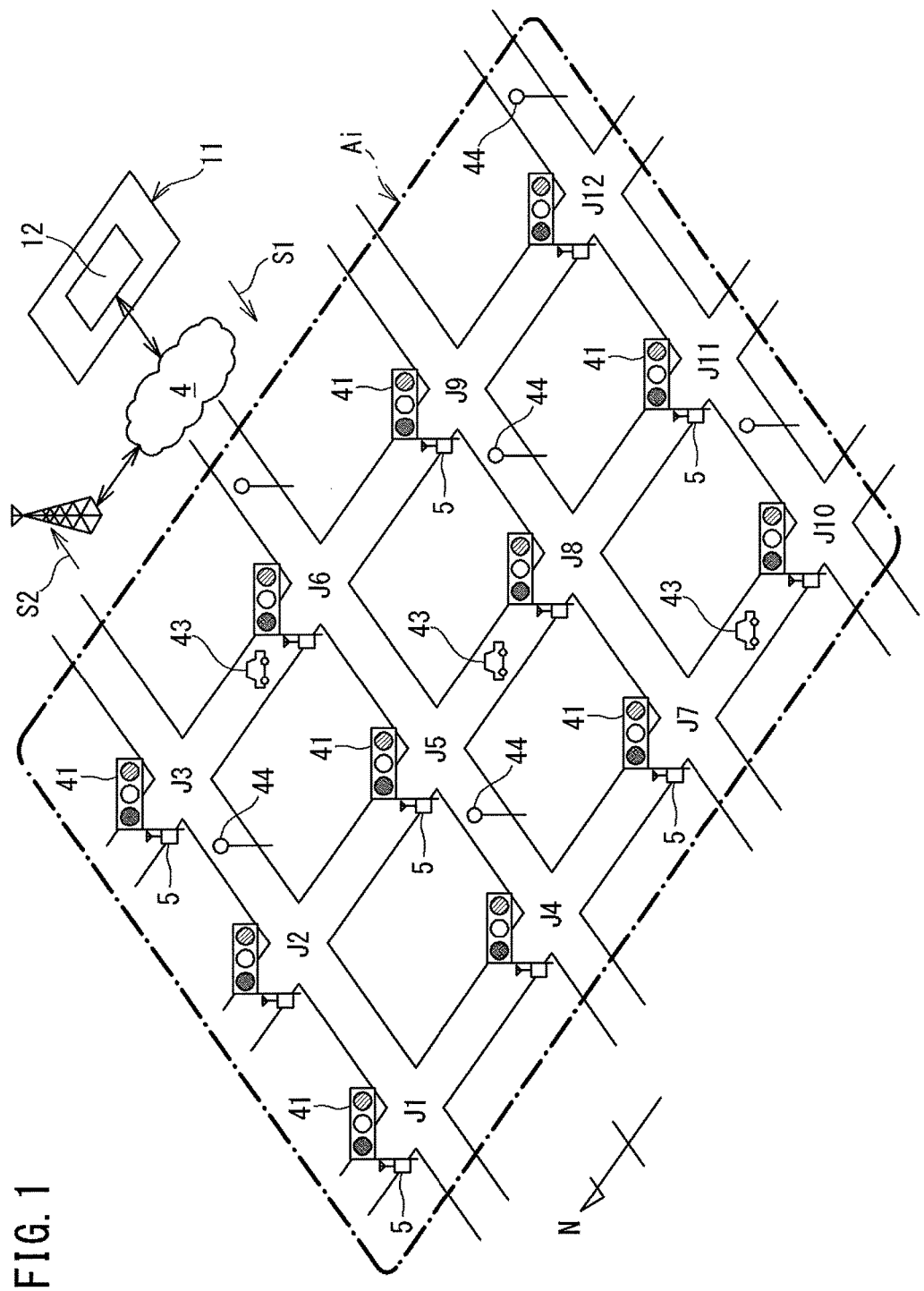
FIG. 1 is a perspective view showing an overall configuration of a traffic control system.

An embodiment of the present invention will be summarized below.

(1) A roadside control apparatus of the present embodiment is a roadside control apparatus capable of wirelessly communicating with a mobile communication apparatus, and includes a receiving unit configured to receive, from the mobile communication apparatus, positional information of a mobile body equipped with the mobile communication apparatus; a control unit configured to analyze, on the basis of the received positional information, present states of at least one of signal control and road traffic at an intersection, and generate output information based on a result of the analysis; and a transmission unit configured to transmit the generated output information to external equipment.

According to the roadside control apparatus of the present embodiment, the control unit analyzes, on the basis of the positional information of the mobile body, the present states of at least one of signal control and road traffic at the intersection, and generates the output information based on the result of the analysis. Therefore, advanced information processing such as analyze of signal information can be dispersed to be executed at each intersection.

Therefore, the output information generated by the roadside control apparatus can be utilized for various controls, such as traffic-actuated control, performed by external equipment.

The output information generated by the roadside control apparatus includes, as described above, whether or not to extend a green interval at an inflow road of the intersection, an equipping rate of the mobile communication apparatus, a convoy delimiting command, etc.

(2) In the roadside control apparatus of the present embodiment, the control unit preferably determines whether or not to extend a green interval at an inflow road of the intersection, on the basis of a driving distance by which a mobile body equipped with the mobile communication apparatus, traveling on the inflow road, drives during the green interval at the inflow road.

(3) Specifically, the control unit may not extend the green interval at the inflow road when the driving distance is less than a predetermined distance.

The reason is as follows. In a case where a driving distance during green interval of a mobile body equipped with the mobile communication apparatus (hereinafter also referred to as "equipped mobile body") is less than a predetermined distance (e.g., "expected driving distance during green interval" described later), it is estimated that there is any reason of stoppage other than traffic light waiting, such as on-street parking of the equipped mobile body or an exit-blocking jam on the exit road, and therefore it cannot be determined that the green interval at the inflow road is insufficient.

(4) In the roadside control apparatus of the present embodiment, the control unit preferably further determines whether or not to extend the green interval at the inflow road, on the basis of a number of times of traffic light waiting, at the inflow road, of the mobile body equipped with the mobile communication apparatus.

(5) Specifically, the control unit preferably extends the green interval at the inflow road, in a case where the driving distance is greater than the predetermined distance and the number of times of traffic light waiting is greater than or equal to a predetermined number of times.

The reason is as follows. If the driving distance during green interval of an equipped mobile body is greater than or equal to the predetermined distance and the number of times of traffic light waiting of the equipped mobile body is greater than or equal to the predetermined number of times, it can be estimated that the equipped mobile body traveling on the inflow road is inhibited to pass through the intersection, not because of stoppage other than traffic light waiting, such as on-street parking of the equipped mobile body or an exit-blocking jam on the exit road, but because of traffic light waiting due to insufficient green interval.

(6) In the roadside control apparatus of the present embodiment, the control unit preferably estimates a number of in-zone equipped mobile bodies which is a number of mobile bodies equipped with the mobile communication apparatus, that are existing in a measurement zone in the inflow road of the intersection, and estimates a total number of in-zone mobile bodies which is a number of all mobile bodies existing in the measurement zone. Then, the control unit preferably divides the number of in-zone equipped mobile bodies by the total number of in-zone mobile bodies to calculate an equipping rate of the mobile communication apparatus.

In this case, it is possible to calculate the equipping rate of the mobile communication apparatus without the necessity of measuring the traffic volume of all mobile bodies by using vehicle detectors.

(7) In a case where the equipping rate of the mobile communication apparatus is calculated, for example, the control unit sets, as an upstream end of the measurement zone, a stop position of one mobile body among one or a plurality of mobile bodies equipped with the mobile communication apparatus, the mobile bodies waiting for a traffic light to change at the intersection.

In this case, a mobile body positioned at the upstream end of the measurement zone is always counted as an equipped mobile body, whereby the equipping rate is likely to be higher than an actual rate.

(8) Hence, the control unit preferably sets, as an upstream end of the measurement zone, a predetermined position on a downstream side of a stop position of one mobile body among one or a plurality of mobile bodies equipped with the mobile communication apparatus, the mobile bodies waiting for a traffic light to change at the intersection.

In this case, inevitable alignment between the upstream end of the measurement zone and the stop position of the equipped mobile body can be avoided, whereby the equipping rate of the mobile communication apparatus can be calculated more precisely.

(9) In the roadside control apparatus of the present embodiment, the control unit preferably transmits a convoy delimiting command for separating a mobile body platoon that is composed of a plurality of mobile bodies equipped with the mobile communication apparatus and is traveling in a convoy, into a platoon of preceding vehicles that can pass through the intersection at a green light this time and a platoon of following vehicles that cannot pass through the intersection at the green light this time, to the mobile communication apparatus of the mobile body platoon.

In this case, a following vehicle is prevented from entering the intersection through a red light, or prevented from being left in the intersection.

(10) In the roadside control apparatus of the present embodiment, the control unit preferably determines whether or not to transmit the convoy delimiting command, on the basis of a traffic light switching timing at the inflow road of the intersection, and positions of a lead mobile body and a rearmost mobile body in the mobile body platoon.

(11) Specifically, the control unit may transmit the convoy delimiting command in a case where the rearmost mobile body in the mobile body platoon cannot pass through the intersection by a green-light end time at the inflow road.

The reason is as follows. If the rearmost mobile body in the mobile body platoon cannot pass through the intersection by the green-light end time at the inflow road, it can be estimated that part of the mobile body platoon will exist in the intersection during a red interval, and therefore the mobile body platoon should be separated by transmitting a convoy delimiting command.

(12) In the roadside control apparatus of the present embodiment, the control unit may transmit the convoy delimiting command in a case where only a part of mobile bodies in the mobile body platoon can pass through the intersection because of an exit-blocking jam that has occurred on an exit road of the intersection.

The reason is as follows. If part of the mobile bodies in the mobile body platoon cannot pass through the intersection due to an exit-blocking jam, the mobile bodies are highly likely left in the intersection, and therefore, the mobile body platoon should be separated by transmitting a convoy delimiting command.

(13) In the roadside control apparatus of present embodiment, the control unit preferably generates information capable of specifying a delimitation position between the preceding vehicles and the following vehicles, in accordance with a length of an empty space that exists on an upstream side of the exit-blocking jam on the exit road, and causes the convoy delimiting command to include the generated information.

In this case, the mobile body platoon can know, in advance, the number of preceding vehicles that can pass through the intersection according to the empty space length, on the basis of the information received from the roadside control apparatus.

(14) A computer program of the present embodiment is a computer program for causing a computer to function as the roadside control apparatus according to any one of above (1) to (13) which is capable of wirelessly communicating with a mobile communication apparatus.

Accordingly, the computer program of the present embodiment has advantageous effects similar to those of the roadside control apparatus described in the above (1) to (13).

(15) An information processing method according to the present embodiment is an information processing method executed by the roadside control apparatus according to any one of above (1) to (13).

Accordingly, the information processing method of the present embodiment has advantageous effects similar to those of the roadside control apparatus described in the above (1) to (13).

Details of Embodiment of Present Invention

Hereinafter, an embodiment of the present invention will be described in detail with reference to the drawings. At least some parts of the embodiment descried below can be combined together as desired.

Definition of Terms

In advance of describing the embodiment in detail, terms used in this specification will be defined below.

A "vehicle" is a general vehicle that travels on a road, for example, a vehicle according to the Road Traffic Law. Vehicles according to the Road Traffic Law include automobiles, motorized bicycles, light vehicles, and trolley buses. Automobiles include vehicles other than four-wheel vehicles, such as motorcycles. In the present embodiment, when simply mentioning a "vehicle", this vehicle means both a probe vehicle that includes an on-vehicle apparatus capable of transmitting probe information, and an ordinary vehicle that does not include such an on-vehicle apparatus.

"Probe information" is various types of information relating to a vehicle, which is obtained from an on-vehicle apparatus of a probe vehicle that actually travels on a road. The probe information is sometimes referred to as probe data or floating car data. The probe information includes data such as a vehicle ID, a vehicle position, a vehicle speed, a vehicle azimuth, and occurrence times thereof.

A "traffic signal controller" is a controller configured to cause a signal light unit of a traffic signal unit to be turned on and turned off according to predetermined traffic light switching timing.

The traffic signal controller of the present embodiment is capable of executing control methods of independent control and remote control which are described later. The traffic signal controller usually executes independent control for an intersection corresponding to the traffic signal controller. Upon receiving signal control parameters from a roadside control apparatus described later, the traffic signal controller determines, in accordance with the received signal control parameters, traffic light switching timing of a signal light unit at the intersection corresponding to the traffic signal controller.

"Signal control parameters" generally include a cycle length, a split, and an offset which are described later. In the present embodiment, traffic light switching timing (start time of each traffic light, indication time thereof, and the like) of a signal light unit at an intersection may be included in signal control parameters.

A "cycle length" is time in one cycle from start time of green light (or red light) of a traffic signal unit to next start time of green light (or red light).

A "split" is a ratio of time (green interval, red interval, or the like) assigned to each aspect, to the cycle length.

An "offset" is a deviation in green-light start time between adjacent intersections. An offset is represented by a percentage to the time of one cycle or by seconds.

A "roadside detector" is a detector unit installed for detecting the traffic condition on a road. Examples of the roadside detector include a vehicle detector, a monitor camera, an optical beacon, and the like.

A vehicle detector is composed of, for example, an ultrasonic vehicle detector configured to detect vehicles traveling directly below the detector, one by one, by using an ultrasonic wave or the like. A monitor camera is composed of, for example, a CCD camera configured to take a time-varying image of a road. An optical beacon is an optical communication device configured to perform optical communication with an on-vehicle apparatus adaptive to optical communication at a predetermined position on a road, and to exchange predetermined information with an infrastructure side.

A "remote control apparatus" is a traffic signal control apparatus capable of executing a remote control described later. The remote control apparatus of the present embodiment also performs a process of determining whether or not to cause a traffic signal controller at an intersection included in an area managed by the remote control apparatus to execute the remote control described later.

When the remote control apparatus causes the traffic signal unit at the intersection included in the area to execute the remote control, the remote control apparatus transmits, to a roadside control apparatus corresponding to the intersection, downlink information including a remote control execution command and downlink information including signal control parameters.

A "roadside control apparatus" is a control apparatus that is installed at a road side, and has: a communication function of wirelessly communicating with a mobile communication apparatus such as an on-vehicle communication apparatus; a function of relaying received information; and a function of executing information processing such as calculation of a traffic index, analysis of signal information, and the like by using the received information.

A "independent control" is a control method for traffic signal control in which right of way at one intersection is a control target. Specifically, the independent control is a traffic signal control for independently controlling traffic light switching timing of a traffic signal unit at one intersection, irrespective of other intersections. This control is also referred to as an independent control.

In the independent control, usually, a fixed time control of switching a traffic light in accordance with a predetermined time schedule is performed. At an intersection where the independent control is executed, local-actuated controls such as pedestrian pushbutton control, recall control, right-turn gap-actuated control, and the like may be performed.

A "coordinated control" is a traffic signal control in which, regarding a plurality of intersections that are continuous along one route, traffic light switching timings of signal light units at the intersections are controlled in relation to each other so that a time delay occurs in signal indication. A route subjected to the coordinated control is referred to as a "coordinated route".

For example, the coordinated control includes a control in which an offset between intersections included in a coordinated route in a subarea is adjusted to allow vehicles to easily pass at a green light in a specific direction of the coordinated route (priority offset), or conversely, allow vehicles to easily stop at a red light.

An "area traffic control" is a traffic signal control in which, regarding a plurality of intersections included in a road network extending planarly, traffic light switching timings of signal light units at the intersections are controlled in relation to each other. Specifically, the area traffic control is a wide-area traffic signal control corresponding to the coordinated control expanded over the road network.

A "remote control" is a control method of a traffic signal control in which rights of way of a plurality of intersections are control targets. Specifically, the remote control is a traffic signal control in which, regarding a plurality of intersections included in a predetermined area, traffic light switching timings of traffic signal units at the intersections are controlled in relation to each other.

Therefore, the coordinated control and the area traffic control described above each correspond to the remote control. A remote control in which the predetermined area is a coordinated route is a coordinated control, and a remote control in which the predetermined area is a planarly expanding road network is an area traffic control.

A "mobile body" is a generic term for objects that pass passable areas such as a public road, a private road, a parking area, and the like. Examples of the mobile body of the present embodiment include the above-described "vehicle", a pedestrian, and the like.

A "wireless communication apparatus" is an apparatus that has a communication function of wirelessly transmitting and receiving a communication frame according to a predetermined protocol, and serves as a transmission/receiving main body of wireless communication. Examples of the wireless communication apparatus include a later-described mobile communication apparatus and the like. The above-described roadside control apparatus is able to perform wireless communication, and therefore is a kind of a wireless communication apparatus.

A "mobile communication apparatus" is a wireless communication apparatus that is mounted in a mobile body (or carried by an occupant or a pedestrian). Examples of the mobile communication apparatus of the present embodiment include an on-vehicle communication apparatus and a portable device which are described later.

An "on-vehicle communication apparatus" is a wireless communication apparatus that is permanently or temporarily mounted in a vehicle. The on-vehicle communication apparatus is sometimes abbreviated to an "on-vehicle apparatus". If capable of wirelessly communicating with a roadside communication apparatus, a portable device such as a cellular phone or a smartphone which is brought into a vehicle by an occupant also corresponds to the on-vehicle communication apparatus.

A "portable device" is a wireless communication apparatus that is carried by an occupant of a vehicle, or a pedestrian. Specifically, examples of the portable device include a cellular phone, a smartphone, a tablet type computer, a notebook computer, and the like.

A "communication frame" is a general term for a PDU (Protocol Data Unit) used for wireless communication of a wireless communication apparatus and a PDU used for wired communication of a roadside communication apparatus including a roadside radio equipment.

[Overall Configuration of Traffic Control System]

FIG. 1 is a perspective view showing an overall configuration of a traffic control system including roadside control apparatuses 5.

In FIG. 1, as an example of a road structure, a grid-pattern structure is assumed in which a plurality of roads in a north-to-south direction and a plurality of roads in an east-to-west direction intersect with each other, but the road structure is not limited thereto.

As shown in FIG. 1, the traffic control system of the present embodiment includes a remote control apparatus 12, roadside control apparatuses 5, traffic signal units 41, vehicles 43 in which on-vehicle communication apparatuses 42 (refer to FIG. 2) are mounted, roadside detectors 44, and the like.

The remote control apparatus 12 is composed of a computer device (also referred to as a "central apparatus") located in a traffic control center 11. The traffic control center 11 may be a dedicated facility managed by a transportation company of the national government or a local government, or may be a data center of a cloud system run by an IaasS (Infrastructure as a Service) company.

In the latter case, the remote control apparatus 12 is composed of a virtual machine constructed in a server computer of the data center by virtualization software.

In FIG. 1, Ai denotes an area, of which control is managed by the remote control apparatus 12. The remote control apparatus 12 is able to perform remote control such as area traffic control and coordinated control to the traffic signal units 41 included in the area Ai.

A traffic signal unit 41 and a roadside control apparatus 5 are installed at each of intersections Jk (in FIG. 1, k=1 to 12) included in the area Ai. The roadside control apparatus 5 at each intersection Jk is able to communicate with the remote control apparatus 12 via a public communication network 4 such as the Internet.

Each roadside control apparatus 5 is installed near the intersection Jk so as to be able to wirelessly communicate with vehicles 43 traveling on a road diverging from the intersection Jk. Therefore, the roadside control apparatus 5 is able to receive radio waves transmitted from on-vehicle communication apparatuses 42 of the vehicles 43 performing vehicle-to-vehicle communication on the road.

Figure 2:
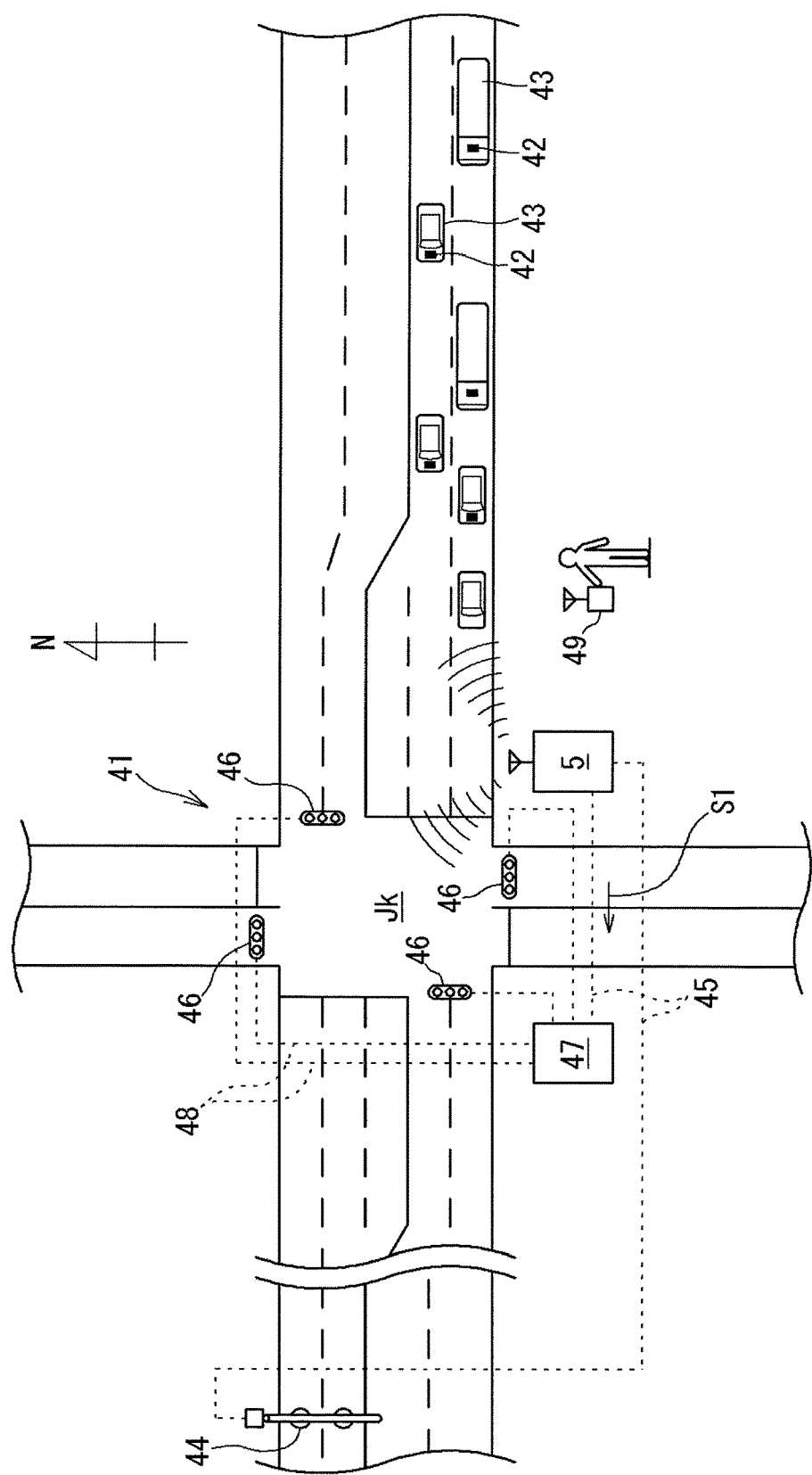
FIG. 2 is a plan view of a road at an intersection where a roadside control apparatus is installed.

Each roadside detector 44 is connected to the corresponding roadside control apparatus 5 via, for example, a predetermined communication line 45 (refer to FIG. 2). A traffic signal controller 47 (refer to FIG. 2) of the traffic signal unit 41 is also connected to the roadside control apparatus 5 via the predetermined communication line 45.

The roadside detector 44 is installed at an appropriate location on a road in the area Ai, mainly for the purpose of counting the number of vehicles that enter the intersection Jk.

The roadside detector 44 includes at least one of: a vehicle detector configured to detect, with an ultrasonic wave or the like, vehicles 43 traveling directly below the detector; a monitor camera configured to time-sequentially photograph the passage state of the vehicles 43; an optical beacon configured to perform optical communication by near-infrared rays with the vehicles 43; and the like.

The remote control apparatus 12 managing the area Ai is able to downlink-transmit, to the roadside control apparatus 5 at each intersection Jk included in the area Ai, "downlink information S1" including an "execution command" or a "cancel command" for remote control, signal control parameters, and the like.

Downlink information S1 for each intersection Jk, which has been downlinked from the remote control apparatus 12, is transmitted to the roadside control apparatus 5 corresponding to the intersection Jk via the public communication network 4, a mobile communication network, and the like.

The remote control apparatus 12 is also able to transmit, to the roadside control apparatus 5, traffic information such as traffic jam information, traffic regulation information, and the like which are included in the downlink information S1.

Upon receiving the downlink information S1 including the traffic information from the remote control apparatus 12, the roadside control apparatus 5 is able to generate a communication frame including the received traffic information, and broadcast the generated communication frame to the on-vehicle communication apparatuses 42 by roadside-to-vehicle communication.

The roadside control apparatus 5 included in the area Ai is able to uplink-transmit, to the remote control apparatus 12, "uplink information S2" including an "execution request" or a "cancel request" for remote control, and a traffic index calculated based on probe information, detector information, and the like.

The uplink information S2 uplinked by the roadside control apparatus 5 is transmitted to the remote control apparatus 12 via the mobile communication network, the public communication network 4, and the like.

In the detector information which is a measurement result of the roadside detector 44 includes detection information detected by a vehicle detector, image data obtained by a monitor camera, or the like. The detector information is collected by the roadside control apparatus 5 of the corresponding intersection Jk.

The on-vehicle communication apparatuses 42 of the vehicles 43 traveling on the road in the area Ai mutually transmit and receive probe information by vehicle-to-vehicle communication. The roadside control apparatus 5 is able to receive the probe information transmitted from the on-vehicle communication apparatus 42 of each vehicle 43.

The roadside control apparatus 5 has a function of, as a wireless communication apparatus of an intelligent transport system (ITS), relaying the probe information received from each on-vehicle communication apparatus 42 to the remote control apparatus 12.

The roadside control apparatus 5 according to the present embodiment is enhanced to a control function exceeding simple relay of information, i.e., to a control function of calculating a traffic index on the basis of the received probe information and detector information, and analyzing signal control (refer to FIG. 5). Therefore, in the following description, the roadside control apparatus 5 may sometimes be referred to as an IEB (ITS Enhance Box) 5.

[Infrastructure Facility Near Intersection]

FIG. 2 is a plan view of a road at an intersection Jk where a roadside control apparatus 5 is installed. While a left-side driving road is shown in FIG. 2, a right-side driving road may be adopted.

As shown in FIG. 2, a traffic signal unit 41 includes: a plurality of signal light units 46 each configured to indicate presence/absence of right of way at each inflow road of the intersection Jk; and a traffic signal controller 47 configured to control timing to turn on and turn off each signal light unit 46. The signal light units 46 are connected to the traffic signal controller 47 via a predetermined signal control line 48.

The roadside detector 44 and the traffic signal controller 47 are communicably connected to the roadside control apparatus 5 via the communication line 45. The roadside detector 44 may be connected to the roadside control apparatus 5 via the traffic signal controller 47.

When a remote control execution command is included in the downlink information S1, the roadside control apparatus 5 switches the control method at the intersection Jk to remote control. When a remote control cancel command is included in the downlink information S1, the roadside control apparatus 5 returns the control method at the intersection Jk back to independent control.

Upon receiving the downlink information S1 including signal control parameters from the remote control apparatus 12, the roadside control apparatus 5 transfers the signal control parameters to the traffic signal controller 47.

In order to provide the vehicles 43 with the traffic light switching timing and the traffic information included in the received downlink information S1, the roadside control apparatus 5 is also able to wirelessly broadcast these pieces of information to the vehicles 43.

The remote control apparatus 12 comprehensively performs: collection of the uplink information S2 uplink-transmitted from the roadside control apparatuses 5 included in the area Ai; traffic signal control based on the information S2; provision of information about the control result; and the like.

Specifically, the remote control apparatus 12 is able to perform, to the traffic signal units 41 at the intersections Jk included in the area Ai, "coordinated control" for controlling a platoon of traffic signal units 41 on the same road, "area traffic control" corresponding to the coordinated control expanded onto a road network, and the like.

The remote control apparatus 12 downlink-transmits the downlink information S1 including control data in each arithmetic cycle (e.g., 2.5 min) of remote control such as area traffic control, and downlink-transmits the downlink information S1 including the traffic information in a predetermined cycle (e.g., 5 min).

[Internal Configuration of Roadside Control Apparatus]

Figure 3:
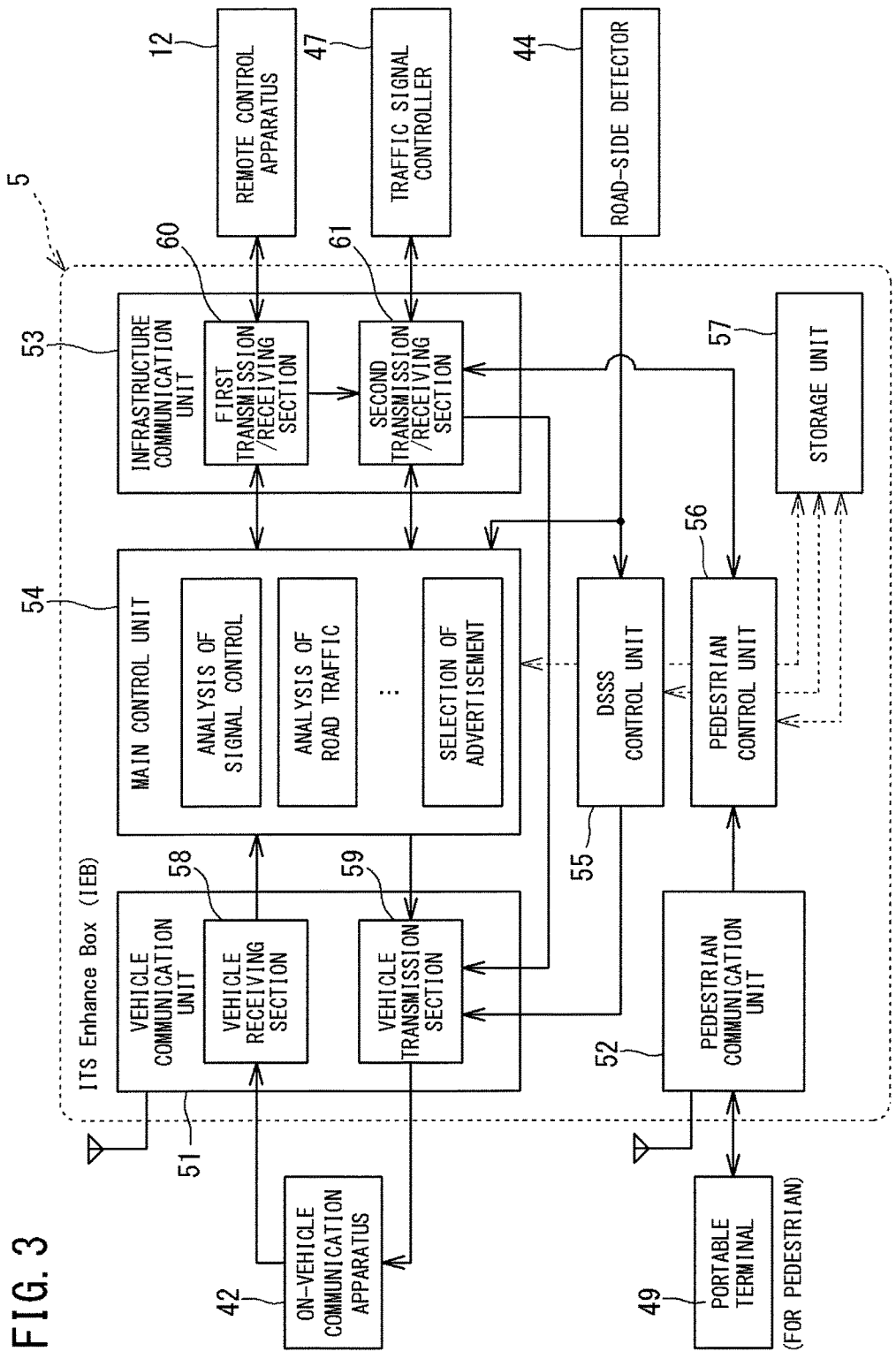
FIG. 3 is a block diagram showing an example of an internal configuration of a roadside control apparatus.

FIG. 3 is a block diagram showing an example of an internal configuration of the roadside control apparatus 5.

As shown in FIG. 3, the roadside control apparatus 5 includes a vehicle communication unit 51, a pedestrian communication unit 52, and an infrastructure communication unit 53 as communication interfaces with external equipment.

The roadside control apparatus 5 includes a main control unit 54, a DSSS (Driving Safety Support System) control unit 55, and a pedestrian control unit 56 as control units for performing signal control and information processing related to road traffic. The roadside control apparatus 5 further includes a storage unit 57.

The vehicle communication unit 51 is composed of a communication interface capable of wirelessly communicating with the on-vehicle communication apparatus 42 in accordance with a communication standard for vehicle-to-vehicle communication (e.g., Wireless Access in Vehicle Environment: WAVE). The vehicle communication unit 51 includes a vehicle receiving section 58 and a vehicle transmission section 59.

The vehicle receiving section 58 is able to receive a communication frame including probe information, which has been transmitted by the on-vehicle communication apparatus 42. The vehicle transmission section 59 is able to broadcast a communication frame in which information for vehicle is stored, to the on-vehicle communication apparatus 42.

The pedestrian communication unit 52 is composed of a communication interface configured to perform wireless communication with a portable device 49 of a pedestrian in accordance with a predetermined communication standard (e.g., wireless LAN, Bluetooth (registered trademark), WAVE, or the like).

The infrastructure communication unit 53 is a communication interface configured to perform communication with other control apparatuses on the infrastructure side. The infrastructure communication unit 53 includes a first transmission/receiving section 60 and a second transmission/receiving section 61.

The first transmission/receiving section 60 is composed of a communication interface configured to perform communication with the remote control apparatus 12 in accordance with a predetermined communication standard.

The first transmission/receiving section 60 may be, for example, a communication interface capable of performing wireless IP communication (refer to FIG. 1) or a communication interface that performs wired communication with the remote control apparatus 12 via a dedicated line as a communication medium.

The second transmission/receiving section 61 is composed of a communication interface configured to perform communication with the traffic signal controller 47 in accordance with a predetermined communication standard.

The second transmission/receiving section 61 may be, for example, a communication interface configured to perform wired communication via a dedicated communication line 45 as a communication medium (refer to FIG. 2) or a communication interface capable of performing wireless communication with the traffic signal controller 47.

Each of the control units 54 to 56 is composed of a control device including one or a plurality of CPU (Central Processing Unit). The storage unit 57 is composed of a storage device including one or a plurality of memories such as RAM (Random Access Memory) and ROM (Read Only Memory).

The storage unit 57 stores therein various computer programs to be executed by the control units 54 to 56, and various data for information processing which have been received from external equipment.

The control units 54 to 56 of the roadside control apparatus 5 are able to realize various control functions useful for traffic administrators and drivers, by reading and executing the computer programs stored in the storage unit 57.

For example, the main control unit 54 is able to execute control including analysis of signal control, analysis of road traffic, advertisement selection control, and the like. Since the main control unit 54 has a wide range of control functions, these functions will be described later.

The DSSS control unit 55 is able to perform safety driving support for a driver of each vehicle 43 on the basis of the detector information acquired from the roadside detector 44.

For example, upon receiving, from the roadside detector 44, a detection signal of a vehicle 43 that enters a main lane from a by-lane, the DSSS control unit 55 generates warning information that notifies the entering vehicle, and causes the vehicle transmission section 59 to transmit the generated warning information. Thus, crossing collision between a vehicle 43 traveling on the main lane and the vehicle 43 that enters the main lane from the by-lane can be avoided.

The pedestrian control unit 56 executes a control regarding services for pedestrians, such as changing the traffic light switching timing in accordance with a request of a pedestrian, providing a pedestrian with signal information held by the traffic signal controller 47, and the like.

For example, upon receiving, from the pedestrian communication unit 52, an "extension request" for green light which is transmitted from the portable device 49 (refer to FIG. 2) of a pedestrian, the pedestrian control unit 56 transmits the received extension request to the traffic signal controller 47 via the second transmission/receiving section 61.

Further, upon acquiring, from the second transmission/receiving section 61, signal information being executed by the traffic signal controller 47, the pedestrian control unit 56 causes the pedestrian communication unit 52 to transmit a communication frame including the acquired signal information and directed to the portable device 49.

[Outline of Control Function of Roadside Control Apparatus]

Figure 4:
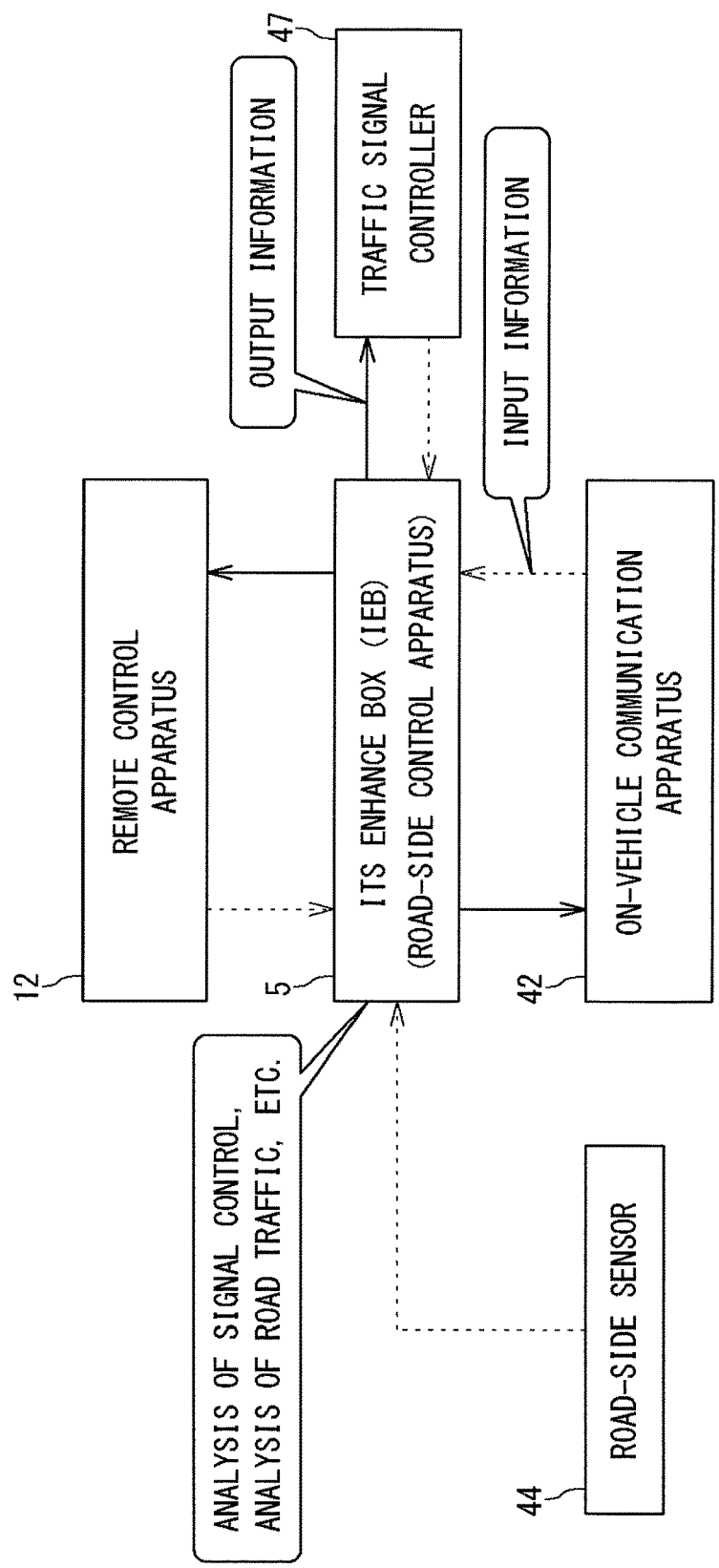
FIG. 4 is a block diagram showing input/output of information to/from the roadside control apparatus.

FIG. 4 is a block diagram showing input/output of information to/from the roadside control apparatus 5.

In FIG. 4, broken-line arrows indicate "input information" that the roadside control apparatus 5 receives from the external equipment, and solid-line arrows indicate "output information" that the roadside control apparatus 5 transmits to the external equipment.

The main control unit 54 of the roadside control apparatus 5 is able to execute "analysis of signal control", "analysis of road traffic", and the like at each intersection Jk, on the basis of the input information received from the external equipment such as the on-vehicle communication apparatus 42, the roadside detector 44, the remote control apparatus 12, and the traffic signal controller 47.

The main control unit 54 of the roadside control apparatus 5 generates output information on the basis of the analysis result, and transmits the generated output information to a predetermined destination.

For example, the main control unit 54 (hereinafter sometimes referred to as "control unit 54") analyzes whether to select independent control or remote control as the signal control at the intersection Jk, on the basis of a traffic index calculated from the detector information, the probe information, and the like, and then transmits, as output information based on the analysis result, a remote control execution command or a remote control cancel command to the remote control apparatus 12 (refer to FIG. 6).

Receiving of the input information and transmission of the output information are executed by, for example, the vehicle communication unit 51 and the infrastructure communication unit 53 (refer to FIG. 3), while analysis of at least one of signal control and road traffic, and generation of output information based on this analysis are executed by the main control unit 54 (refer to FIG. 3).

[Specific Example of Control Function of Roadside Control Apparatus]

FIG. 5 is a table providing a summary of specific examples of control functions the roadside control apparatus 5 can execute.

As shown in FIG. 5, control functions that the roadside control apparatus 5 can execute (specifically, control functions that the control unit 54 shown in FIG. 3 can execute) include, in order from the top of the table, "analysis of signal control", "analysis of road traffic", "improvement of local-actuated control", "detector emulation", "data thinning", and "advertisement selection control". The roadside control apparatus 5 is able to execute at least one of these control functions.

The "analysis of signal control" is information processing including: analyzing the present state of signal control at the intersection Jk on the basis of the traffic light switching timing at the present at the intersection Jk, the probe information, and the like; and generating output information on the basis of the result of the analysis.

The analysis of signal control includes "switching between independent control and remote control (FIG. 6)", "green interval adjustment (FIG. 7)", "convoy priority control (FIG. 8)", and "convoy delimiting control (FIG. 9 to FIG. 13)".

The "switching between independent control and remote control (FIG. 6)" is switching of signal control at the intersection Jk to either independent control (independent control) or remote control in accordance with the present traffic state at the intersection Jk.

Input information used for the switching between independent control and remote control is detector information, probe information, and the like. Output information used for the switching is a remote control execution request or a remote control cancel request, and the destination thereof is the remote control apparatus 12.

The "green interval adjustment (FIG. 7)" is a control to adjust green interval in which right of way is given, for each of inflow roads of the intersection Jk, on the basis of traveling behavior, of a vehicle 43, specified from probe information.

Input information used for the green interval adjustment is the traffic light switching timing at the present moment in the intersection Jk, the probe information, and the like. Output information used for the green interval adjustment is a green interval extension command, and the destination thereof is the traffic signal controller 47 or the remote control apparatus 12.

The "convoy priority control (FIG. 8)" is a control to extend the green interval so that a vehicle platoon traveling in a convoy under cooperative adaptive cruise control (hereinafter referred to as "CACC") can pass through the intersection Jk.

Input information used for the convoy priority control is the traffic light switching timing at the present moment in the intersection Jk, probe information of vehicles 43 traveling in a convoy, and the like. Output information used for the convoy priority control is a green interval extension command, and the destination thereof is the traffic signal controller 47.

The "convoy delimiting control (FIG. 9 to FIG. 13)" is a control to instruct a vehicle platoon including a plurality of vehicles 43 traveling in a convoy under CACC to delimit the convoy to the number of vehicles that can appropriately pass through the intersection Jk.

Input information used for the convoy delimiting control is the traffic light switching timing at the present moment in the intersection Jk, probe information of vehicles 43 traveling in a convoy, and the like. Output information used for the convoy delimiting control is a convoy separation command, and the destination thereof is the on-vehicle communication apparatuses 42 of the vehicles 43 traveling in a convoy.

The "analysis of road traffic" is information processing including: analyzing the present state of road traffic at the intersection Jk; and generating output information on the basis of the result of the analysis.

The traffic analysis includes "calculation of on-vehicle apparatus equipping rate (FIG. 14 to FIG. 17)". The on-vehicle apparatus equipping rate is a ratio of the number of vehicles equipped with on-vehicle apparatuses to the actual number of vehicles. Input information used for the calculation of on-vehicle apparatus equipping rate is detector information, probe information, and the like. Output information used for the calculation of on-vehicle apparatus equipping rate is the on-vehicle apparatus equipping rate, and the destination thereof is the remote control apparatus 12.

The "improvement of local-actuated control (FIG. 18)" is improvement, by the roadside control apparatus 5, of local-actuated control being executed by the traffic signal controller 47 at the intersection Jk.

Input information used for the improvement of local-actuated control is the traffic light switching timing at the present moment in the intersection Jk, probe information, and the like. Output information used for the improvement of local-actuated control is a emulated pulse signal, and the destination thereof is the traffic signal controller 47.

It is noted that the emulated pulse signal is a pulse signal simulatively generated by the roadside control apparatus 5 so as to resemble a detection pulse signal generated by a vehicle detector that detects vehicles 43 one by one.

The "detector emulation (FIG. 19)" is processing including: inputting a emulated pulse signal generated from probe information by the roadside control apparatus 5 to the traffic signal controller 47; and causing the traffic signal controller 47 to execute signal control similar to that performed at the intersection Jk where a vehicle detector is installed.

Input information used for the detector emulation is the traffic light switching timing at the present moment in the intersection Jk, probe information, and the like. Output information used for the detector emulation is the emulated pulse signal, and the destination thereof is the traffic signal controller 47.

The "data thinning (FIG. 20)" is uplink transmission of transmitting only necessary information by thinning the information received by the roadside control apparatus 5 so as to eliminate unnecessary information, in contrast to uplink transmission of unconditionally transmitting the information received by the roadside control apparatus 5 to the remote control apparatus 12.

Input information used for the data thinning is detector information, probe information, and the like. Output information used for the data thinning is the necessary information that has not been subjected to the data thinning, and the destination thereof is the remote control apparatus 12.

The "advertisement selection control (FIG. 21(a))" is a control to select advertisement information to be broadcast to vehicles 43 by the roadside control apparatus 5, from among a plurality of pieces of advertisement information stored in the roadside control apparatus 5 in advance.

Input information used for the advertisement selection control is pieces of advertisement information provided from the remote control apparatus 12, priority levels thereof, and the like. Output information used for the advertisement selection control is the selected advertisement information, and the destination thereof is on-vehicle communication apparatuses 42.

As shown in FIG. 4 and FIG. 5, in the roadside control apparatus 5 of the present embodiment, the control unit 54 (refer to FIG. 3) analyzes at least one of the present states of signal control and road traffic at the intersection Jk on the basis of the vehicle position and the like included in the probe information, and generates output information based on the result of the analysis.

Therefore, advanced information processing such as analysis of signal information can be dispersed to be executed at each intersection Jk. Therefore, the output information generated by the roadside control apparatus 5 can be used for various controls such as traffic-actuated control performed by the remote control apparatus 12 and the traffic signal controller 47.

In a case where the IEB 5 is caused to execute only a control such as convoy priority control (FIG. 8) or convoy delimiting control (FIG. 9 to FIG. 13) in which the IEB 5 does not exchange input information and output information with the remote control apparatus 12, the IEB 5 need not be communicably connected to the remote control apparatus 12.

Further, in a case where the IEB 5 is caused to execute a control such as calculation of on-vehicle apparatus equipping rate (FIG. 14 to FIG. 17) in which the IEB 5 does not exchange input information and output information with the traffic signal controller 47, the IEB 5 need not be communicably connected to the traffic signal controller 47.

Hereinafter, the contents of the respective control functions that the roadside control apparatus 5 can execute will be described with reference to FIG. 6 to FIG. 21(b). Each of road maps in FIGS. 6 to 21(b) shows a right-side driving road.

In the following description, a vehicle 43 (probe vehicle) equipped with an on-vehicle communication apparatus 42 may sometimes be referred to as an "equipped vehicle 43A", and a vehicle 43 not equipped with an on-vehicle communication apparatus 42 may sometimes be referred to as a "non-equipped vehicle 43B". In each figure, equipped vehicles (probe vehicles) 43A are hatched while non-equipped vehicles 43B are not hatched.

[Outline of Switching Between Independent Control and Remote Control]

FIG. 6 is an explanatory diagram showing an outline of switching between independent control and remote control.

As shown in FIG. 6, the IEB 5 monitors a traffic index at an intersection Jk that the IEB 5 covers, by using probe information or the like received from equipped vehicles 43A.

The traffic index that the IEB 5 monitors is at least one of, for example, an inflow traffic volume at the intersection Jk, a waiting queue length, travel time, and an average speed of vehicles 43.

The remote control apparatus 12 shown in FIG. 6 is able to transmit, to the roadside control apparatus 5 at an intersection J1 (refer to FIG. 1), a signal control parameter for the specific intersection J1, and is able to transmit, to the roadside control apparatus 5 at another intersection J2 (refer to FIG. 1), a signal control parameter for the another intersection J2.

Therefore, each of the roadside control apparatuses 5 included in the area Ai receives downlink information S1 including the signal control parameter for the intersection Jk corresponding to the roadside control apparatus 5.

The remote control apparatus 12 causes the downlink information S1 to include an "execution command" for remote control, in a case where the traffic signal units 41 at part or all of the intersections Jk included in the area Ai are caused to start remote control.

The remote control apparatus 12 causes the downlink information S1 to include a "cancel command" for remote control, in a case where the traffic signal units 41 at part or all of the intersections Jk included in the area Ai are caused to end remote control and returned to independent control.

The remote control apparatus 12, when executing remote control for part or all of the intersections Jk included in the area Ai, performs coordinated control, area traffic control, or the like in which part or all of the intersections Jk included in the area Ai are control targets, and generates, for each intersection Jk, a signal control parameter to be applied to the traffic signal unit 41.

The remote control apparatus 12 is able to cause the downlink information S1 to include the generated signal control parameter for each intersection Jk, and notify the roadside control apparatus 5 at the corresponding intersection Jk of the signal control parameter.

An "execution request" shown in FIG. 6 is a communication frame that requests the remote control apparatus 12 to execute remote control, in a case where the IEB 5 at an intersection Jk executing independent control has determined that remote control is necessary, on the basis of the traffic index being monitored.

For example, as shown in the left-side road map in FIG. 6, when the IEB 5 has determined that independent control cannot handle the traffic anymore because the inflow traffic volume at the intersection Jk is greater than or equal to a predetermined value, the IEB 5 transmits a remote control execution request to the remote control apparatus 12.

Upon receiving the execution request, the remote control apparatus 12 also confirms, by itself, that remote control is executable, and thereafter transmits a remote control execution command to the IEB 5 that has transmitted the execution request.

Upon receiving the remote control execution command, the roadside control apparatus 5 starts to transfer the signal control parameter generated by the remote control apparatus 12 to the traffic signal controller 47. Thus, the signal control at the intersection Jk is switched from independent control to remote control.

A "cancel request" shown in FIG. 6 is a communication frame that requests the remote control apparatus 12 to cancel remote control, in a case where the IEB 5 at an intersection Jk executing remote control has determined that remote control is not necessary on the basis of the traffic index being monitored.

For example, as shown in the right-side road map in FIG. 6, when the IEB 5 has determined that independent control can handle the traffic because the inflow traffic volume at the intersection Jk is less than the predetermined value, the IEB 5 transmits a remote control cancel request to the remote control apparatus 12.

Upon receiving the cancel request, the remote control apparatus 12 also confirms, by itself, that remote control can be canceled, and thereafter transmits a remote control cancel command to the IEB 5 that has transmitted the cancel request.

Upon receiving the remote control cancel command, the roadside control apparatus 5 stops transfer of the signal control parameter generated by the remote control apparatus 12 to the traffic signal controller 47. Thus, the signal control at the intersection Jk is switched from remote control to independent control.

As described above, the IEB 5 according to the present embodiment transmits a remote control execution request to the remote control apparatus 12 in accordance with the traffic index. Therefore, when independent control becomes insufficient to handle the traffic state, the IEB 5 can cause the remote control apparatus 12 to start remote control.

Further, the IEB 5 transmits a remote control cancel request to the remote control apparatus 12 in accordance with the traffic index. Therefore, it is possible to avoid a situation that the remote control apparatus 12 unnecessarily continues remote control even after the traffic state has returned to the state that can be handled by independent control.

[Outline of Green Interval Adjustment and Processing Contents Thereof]

Figure 7A:
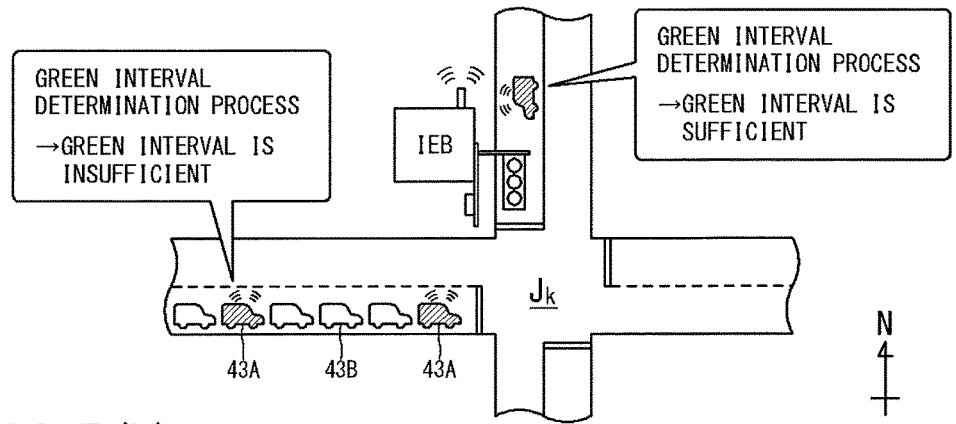
FIG. 7(a) is an explanatory diagram showing an outline of green interval adjustment.
Figure 7B:
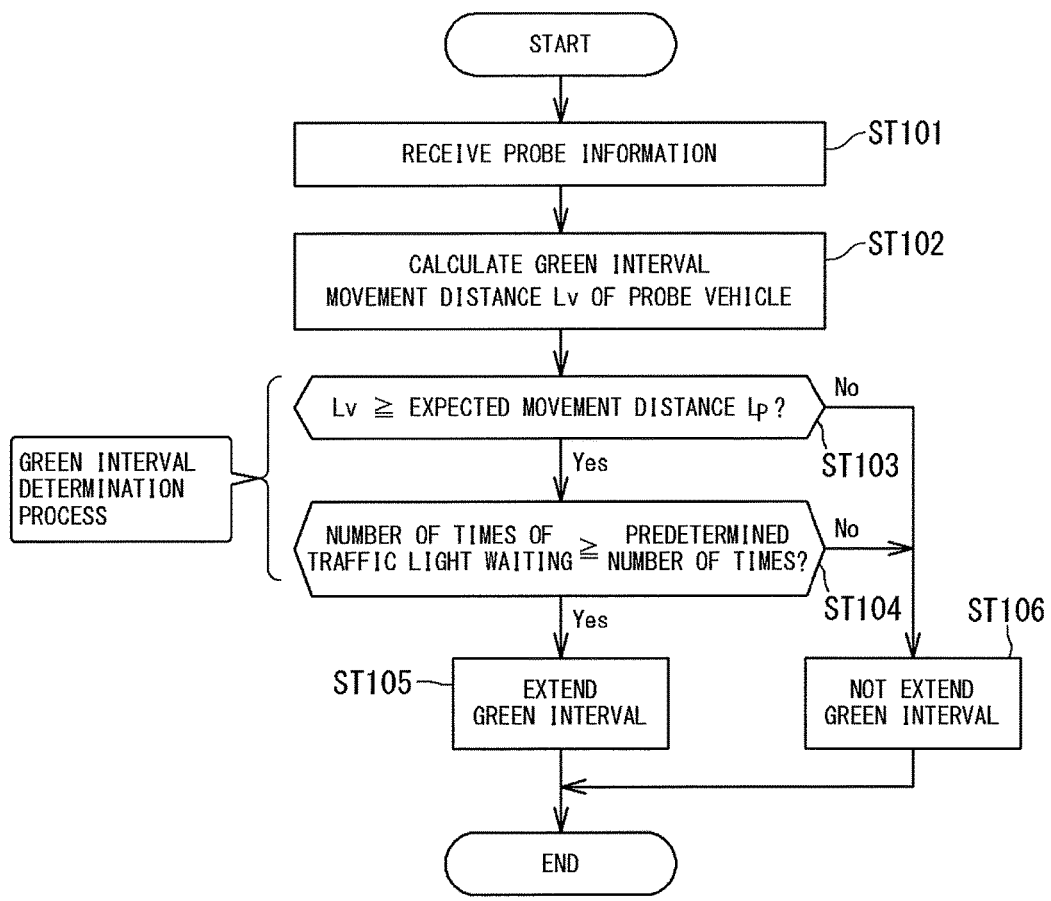
FIG. 7(b) is a flowchart showing processing contents of the green interval adjustment.

FIG. 7(a) is an explanatory diagram showing an outline of green interval adjustment. FIG. 7(b) is a flowchart showing processing contents of green interval adjustment.

As shown in FIG. 7(a), the IEB 5 executes a "green interval determination process" for each of inflow roads at an intersection Jk. The green interval determination process is a process of determining, for each inflow road, whether or not the green interval at the present moment is insufficient.

FIG. 7(a) shows a case where, at an inflow road in the east-to-west direction, the number of vehicles traveling toward the intersection Jk is great and therefore the green interval is insufficient while, at an inflow road in the south-to-north direction, the number of vehicles traveling toward the intersection Jk is less and therefore the green interval is sufficient.

In this case, the IEB 5 reduces, by predetermined adjustment time (e.g., 10 sec), the green interval in the south-to-north direction in which the green interval is sufficient, and increases, by the adjustment time, the green interval in the east-to-west direction in which the green interval is insufficient, thereby adjusting the green interval in each direction while maintaining one cycle in a constant time period.

The IEB 5 does not perform the green interval adjustment described above when the green interval is insufficient in all the directions and when the green interval is sufficient in all the directions.

The green interval determination process by the IEB 5 is executed on the basis of "number of times of traffic light waiting" of an equipped vehicle 43A at the intersection Jk, and "driving distance during green interval" of an equipped vehicle 43A at the inflow road.

The "number of times of traffic light waiting" is the number of red lights that an equipped vehicle 43A that has stopped at a red light at the intersection Jk meets before passing through the intersection Jk.

Therefore, the number of times of traffic light waiting=1 means that an equipped vehicle 43A could pass through the intersection Jk at a green light immediately after a stop thereof at a red light. The number of times of traffic light waiting=2 means that an equipped vehicle 43A could not pass through the intersection Jk at a green light immediately after a stop thereof at a red light but could pass through the intersection Jk at a green light in the next cycle.

Likewise, the number of times of traffic light waiting=3 means that an equipped vehicle 43A could not pass through the intersection Jk at a green light in the next cycle but could pass through the intersection Jk at a green light in the cycle after the next cycle.

When the number of times of traffic light waiting is 1 or less, it is considered that the green interval is sufficient because this is normal traffic light waiting in which the equipped vehicle 43A has passed through the intersection Jk at the first green interval.

When the number of times of traffic light waiting is 2 or more, since the equipped vehicle 43A has passed through the intersection Jk after missing two or more green intervals, the time interval corresponding to one green light is not sufficiently long to handle a waiting queue of vehicles 43 including the equipped vehicle 43A, and therefore there is a possibility that the green interval is insufficient.

The reason for an equipped vehicle 43A to pass through the intersection Jk after missing two or more green intervals may be not only shortage of the green interval but also on-street parking of the equipped vehicle 43A in front of the intersection Jk, or occurrence of a "exit-blocking jam" on an exit road of the intersection Jk.

Therefore, in the green interval determination process, a result of comparison between a driving distance Lv of an equipped vehicle 43A during green interval and an expected driving distance Lp thereof during green interval is also considered as a material for determining whether or not the green interval is insufficient.

The driving distance Lv during green interval is a distance by which an equipped vehicle 43A drives on the inflow road of the intersection Jk from when a green light starts to when the green light ends.

Specifically, the IEB 5 sets, as the driving distance Lv during green interval, a distance from the position of an equipped vehicle 43A at a green-light start point to the position of the equipped vehicle 43A at a green-light end point. The green-light start point and the green-light end point can be specified on the basis of signal information, of the intersection Jk, received from the traffic signal controller 47, and the position of the equipped vehicle 43A can be specified on the basis of probe information received from the equipped vehicle 43A.

The expected driving distance Lp during green interval is a queue length corresponding to the number of vehicles to be handled by one green interval, in a case where a queue of vehicles waiting for a traffic light to change is formed on the upstream side from the stop line of the intersection Jk. Specifically, the expected driving distance Lp during green interval is a constant calculated by an expression below:

$$Lp=(Tg/s)\times d$$

where "Tg" is the green interval (sec), "s" is the vehicle handling rate (number of vehicles/sec), and "d" is the average space headway (m) when vehicles are waiting for a traffic light to change. For example, assuming that Tg=60 sec, s=2 vehicles/sec, and d=7 m, Lp=60÷2×7=210 m is satisfied.

Determination as to whether or not an equipped vehicle 43A has stopped at the inflow road can be performed by determining whether or not the speed of an equipped vehicle 43A, the position of which is in the inflow road and the direction of which is toward the intersection Jk, once goes below a speed threshold (e.g., 4 km/hour) as small as a speed at which the vehicle seems to stop and then exceeds the speed threshold again.

In a case where driving distance Lv during green interval<expected driving distance Lp during green interval, it is estimated that there is any reason other than traffic light waiting, such as parking or exit-blocking jam. In a case where driving distance Lv during green interval≥expected driving distance Lp during green interval, it is estimated that there is no reason other than traffic light waiting at the intersection Jk.

Therefore, for an inflow road in which Lv≥Lp and the number of times of traffic light waiting≥predetermined number of times (e.g., 2), the IEB 5 determines that the green interval is insufficient. On the other hand, for an inflow road in which either of these inequalities is not satisfied, the IEB 5 determines that the green interval is sufficient.

Specific example of the green interval adjustment by the IEB 5 is shown in the flowchart of FIG. 7(b). The IEB 5 executes the processing of the flowchart shown in FIG. 7(b) for a plurality of inflow roads (in the east-to-west direction and the south-to-north direction, for example) of an intersection Jk that the IEB 5 covers.

In this example, the inflow road in the east-to-west direction is assumed. When the IEB 5 receives probe information from an equipped vehicle 43A traveling on the inflow road in the east-to-west direction (step ST101), the IEB 5 calculates a driving distance Lv during green interval on the basis of the vehicle position and the like included in the probe information (step ST102).

Next, the IEB 5 determines whether or not Lv≥Lp is satisfied (step ST103).

When the result of the determination in step ST103 is negative, the IEB 5 does not extend the green interval at the inflow road in the east-to-west direction (step ST106).

When the result of the determination in step ST103 is positive, the IEB 5 further determines whether or not the number of times of traffic light waiting≥predetermined number of times (e.g., 2) is satisfied (step ST104).

When the result of the determination in step ST104 is negative, the IEB 5 does not extend the green interval at the inflow road in the east-to-west direction (step ST106).

When the result of the determination in step ST104 is positive, the IEB 5 extends the green interval at the inflow road in the east-to-west direction (step ST105). That is, the inflow road in the east-to-west direction is a target direction of green interval extension.

The IEB 5 also performs the processing of the flowchart shown in FIG. 7(b) for the inflow road in the south-to-north direction to determine whether or not the green interval at the inflow road in the south-to-north direction should be extended.

For example, as shown in FIG. 7(a), in the case where the green interval at one of the two inflow roads is determined to be extended (determined to have insufficient green interval) while the green interval at the other inflow road is determined not to be extended (determined to have sufficient green interval), the IEB 5 assigns a green interval corresponding to a predetermined adjustment time from the other inflow road to the one inflow road.

When extending the green interval at the intersection Jk, the IEB 5 generates a communication frame of a green interval extension command, and transmits the generated communication frame to a roadside apparatus that is executing signal control for the intersection Jk.

For example, when the traffic signal controller 47 executes signal control for the intersection Jk, the IEB 5 transmits the extension command to the traffic signal controller 47. When the remote control apparatus 12 executes signal control for the intersection Jk, the IEB 5 transmits the extension command to the remote control apparatus 12.

The green interval adjustment by the IEB 5 shown in FIG. 7 is performed for at least the green interval in a straight advancing direction as seen from the inflow road.

In the case of an intersection Jk having signal light units (green arrows or the like) that individually indicate rights of way in a left-turn direction and a right-turn direction as seen from the inflow road, the green interval adjustment shown in FIG. 7 may be executed for at least one of the green interval in the left-turn direction and the green interval in the right-turn direction.

[Outline of Convoy Priority Control]

FIG. 8(a) is an explanatory diagram showing the necessity of convoy priority control. FIG. 8(b) is an explanatory diagram showing an outline of the convoy priority control.

A reference numeral 43G in the figures denotes a "vehicle platoon" traveling in a convoy, that is, a plurality of equipped vehicles 43A traveling in a convoy while keeping an appropriate inter-vehicle distance by performing traveling control such as CACC.

A technique has already been developed in which a plurality of equipped vehicles 43A travel in a convoy with an inter-vehicle distance less than that in ordinary ACC (Adaptive Cruise Control), by utilizing CACC which allows vehicles 43 performing vehicle-to-vehicle communication to share acceleration/deceleration information to realize advanced inter-vehicle distance control.

In this case, for example, when a plurality of large vehicles travel in a convoy according to CACC over a long distance on a highway, fuel efficiency of a following vehicle is improved because a preceding vehicle serves as a wind shield for the following vehicle, and a burden on a driver of the following vehicle that is automatically driven is reduced.

Therefore, it is expected that popularization of such convoy travel according to CACC may lead to a reduction in $CO_2$ emission and an increase in safety of vehicle traveling.

However, in a case where a vehicle platoon 43G travels in a convoy on a local road where the traffic signal unit 41 is installed, the time required for the vehicle platoon 43G to pass through the intersection Jk increases with an increase in the number of vehicles included in the vehicle platoon 43G, which may lead to a situation that the vehicle platoon 43G cannot appropriately travel on the local road.

For example, as shown in FIG. 8(a), there is a case where the signal light was green when a lead vehicle in the vehicle platoon 43G was traveling in front of the intersection Jk, but turns to red at a moment when a part of the vehicle platoon 43G enters the intersection Jk.

In this case, if a following vehicle other than the lead vehicle in the vehicle platoon 43G is braked, the convoy travel is interrupted, and if the following vehicle is not braked, this vehicle may go through the red light to enter the intersection Jk.

As shown in FIG. 8(b), when the IEB 5 detects the vehicle platoon 43G traveling in a convoy on the inflow road of the intersection Jk, the IEB 5 extends the green interval at the intersection Jk so that a rearmost vehicle (most-upstream-side equipped vehicle 43A) in the vehicle platoon 43G can pass through the intersection Jk at a green light.

The convoy priority control executed by the IEB 5 can prevent interruption of convoy travel of the vehicle platoon 43G, driving through red light, and the like from occurring. Therefore, the vehicle platoon 43G is allowed to appropriately travel on the local road.

In the example of FIG. 8(b), "convoy travel information" indicating that all or part of the equipped vehicles 43A (e.g., the lead vehicle) included in the vehicle platoon 43G are traveling in a convoy is included in probe information of vehicle-to-vehicle communication and transmitted.

Therefore, the IEB 5 can detect, in advance, that the vehicle platoon 43G traveling in a convoy is approaching the intersection Jk, on the basis of the convoy travel information, the vehicle position, the vehicle azimuth, and the like included in the probe information received from each equipped vehicle 43A.

The probe information transmitted from an equipped vehicle 43A (e.g., the lead vehicle) traveling in a convoy also includes information (hereinafter referred to as "intra-platoon identification information"), such as a number value of the vehicle platoon 43G, the total number of vehicles in the vehicle platoon 43G, or the like, by which the position of the equipped vehicle 43A counting from the lead (or rearmost) vehicle in the vehicle platoon 43G can be specified.

Therefore, the IEB 5 extends the green interval in the approaching direction of the vehicle platoon 43G if the rearmost vehicle cannot pass through the intersection Jk before the present green interval ends, and does not extend the green interval if the rearmost vehicle can pass through the intersection Jk before the present green interval ends.

In the convoy priority control shown in FIG. 8(b), when the green interval in the approaching direction (the east-to-west direction in FIG. 8) of the vehicle platoon 43G is extended, it is preferred to reduce the green interval in the crossing direction (the south-to-north direction in FIG. 8) by the extended time. This is to prevent the time period in one cycle at the intersection Jk from being disordered.

In the convoy priority control shown in FIG. 8(b), the extension time by which the green interval is extended is preferably within a predetermined limit. This is because too long extension time may inhibit passage of vehicles in the crossing direction that crosses the approaching direction of the vehicle platoon 43G.

[Outline of Convoy Delimiting Control]

Figure 9A:
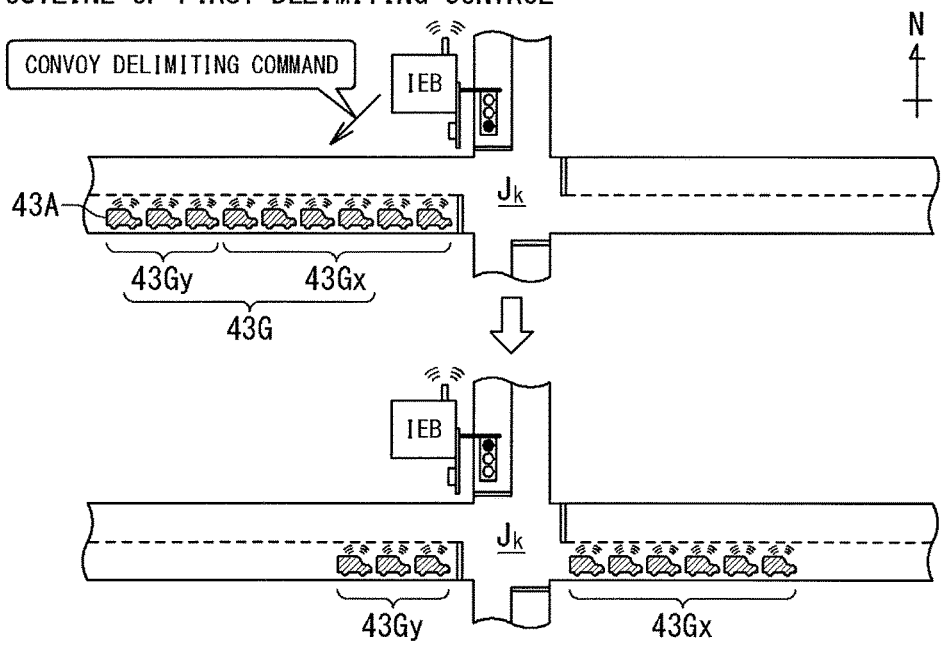
FIG. 9(a) is an explanatory diagram showing an outline of first delimiting control.
Figure 9B:
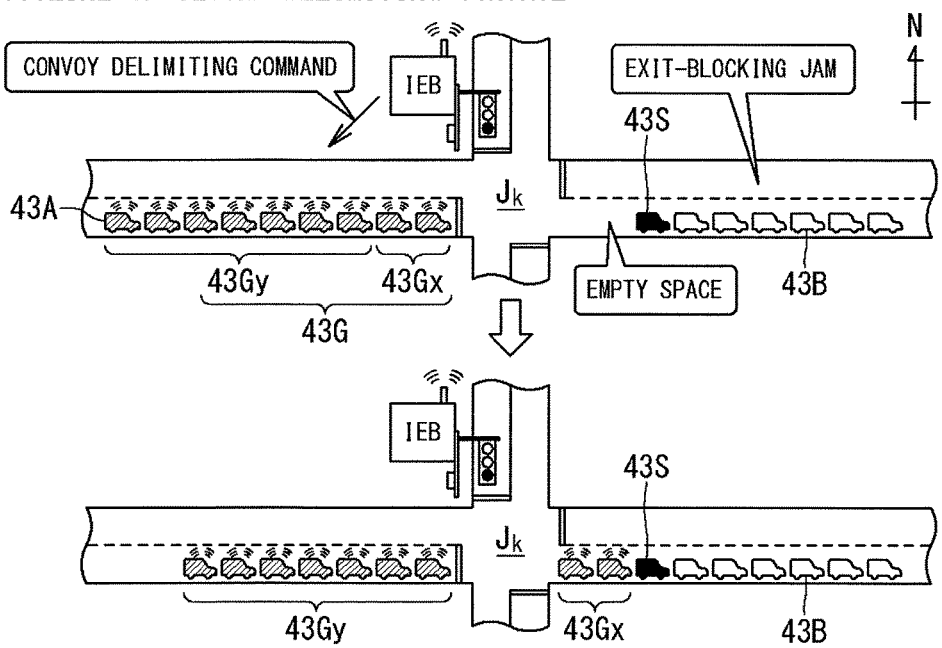
FIG. 9(b) is an explanatory diagram showing an outline of second delimiting control.

FIGS. 9(a) and 9(b) show two types of convoy delimiting controls that the IEB 5 can execute. FIG. 9(a) is an explanatory diagram showing an outline of a first delimiting control. FIG. 9(b) is an explanatory diagram showing an outline of a second delimiting control.

The first delimiting control shown in FIG. 9(a) is convoy delimiting control based on green interval. The second delimiting control shown in FIG. 9(b) is convoy delimiting control based on an exit-blocking jam.

In the figures, a reference numeral 43Gx denotes "preceding vehicles", in a vehicle platoon 43G traveling in a convoy, to be allowed to pass through an intersection Jk at the present green interval, and a reference numeral 43Gy denotes "following vehicles", in the vehicle platoon 43G, to be allowed to pass through the intersection Jk at the next green interval.

Further, reference numeral 43S denotes a tail vehicle positioned at an end of an exit-blocking jam that has occurred on an exit road of the intersection Jk, among vehicles 43 traveling on the downstream side of the vehicle platoon 43G traveling in a convoy. The tail vehicle 43S is either an equipped vehicle 43A or a non-equipped vehicle 43B.

In the above-described convoy priority control (FIG. 8), if the green interval in the traveling direction (the east-to-west direction in FIG. 8) of the vehicle platoon 43G is extended, the green interval in the crossing direction (the south-to-north direction in FIG. 8) is reduced by the extended time, which may cause a traffic jam in the crossing direction.

In particular, as shown in FIG. 9(a), when the frequency of passage of a vehicle platoon 43G including a large number of vehicles in a convoy (9 vehicles in FIG. 9(a)) is increased, the frequency of extending the green interval up to an extension limit is also increased, and thus adverse effect on the traffic in the crossing direction is increased.

Hence, the IEB 5 generates delimiting information corresponding to the boundary between the preceding vehicles 43Gx and the following vehicles 43Gy in accordance with the remaining green interval at the present moment, and transmits a convoy delimiting command including the generated delimiting information to the vehicle platoon 43G This is the convoy delimiting control (=first delimiting control) based on the green interval.

Since the first delimiting control executed by the IEB 5 allows the vehicle platoon 43G to know the delimiting information according to the remaining green interval in advance, it is possible to prevent the following vehicle 43Gy from being left in the intersection Jk even if the green interval in the approaching direction of the vehicle platoon 43G is not extended.

Further, even in a case where the vehicle platoon 43G is too long to be handled by extending the green interval by the convoy priority control (FIG. 8), it is possible to prevent the following vehicle 43Gy from being left in the intersection Jk.

The IEB 5 may execute only the first delimiting control as the convoy delimiting control based on the green interval without executing the convoy priority control (FIG. 8) (independent processing), or may execute the first delimiting control in parallel with the convoy priority control (parallel processing).

On the other hand, in a case where a "exit-blocking jam" has occurred on the exit road of the intersection Jk as shown in FIG. 9(*b*), an equipped vehicle 43A as a part of the vehicle platoon 43G may stop in the intersection Jk even if the green interval in the approaching direction of the vehicle platoon 43G is sufficient.

Hence, the IEB 5 generates delimiting information corresponding to the boundary between the preceding vehicles 43Gx and the following vehicles 43Gy in accordance with an empty space on the upstream side of the exit-blocking jam, and transmits a convoy delimiting command including the delimiting information to the vehicle platoon 43G This is the convoy delimiting control (=second delimiting control) based on an exit-blocking jam.

The second delimiting control executed by the IEB 5 allows the vehicle platoon 43G to know the delimiting information according to the empty space on the upstream side of the exit-blocking jam in advance, it is possible to prevent the following vehicle 43Gy from being left in the intersection Jk even if the exit-blocking jam has occurred on the exit road of the intersection Jk.

[Processing Contents of First Delimiting Control]

Figure 10:
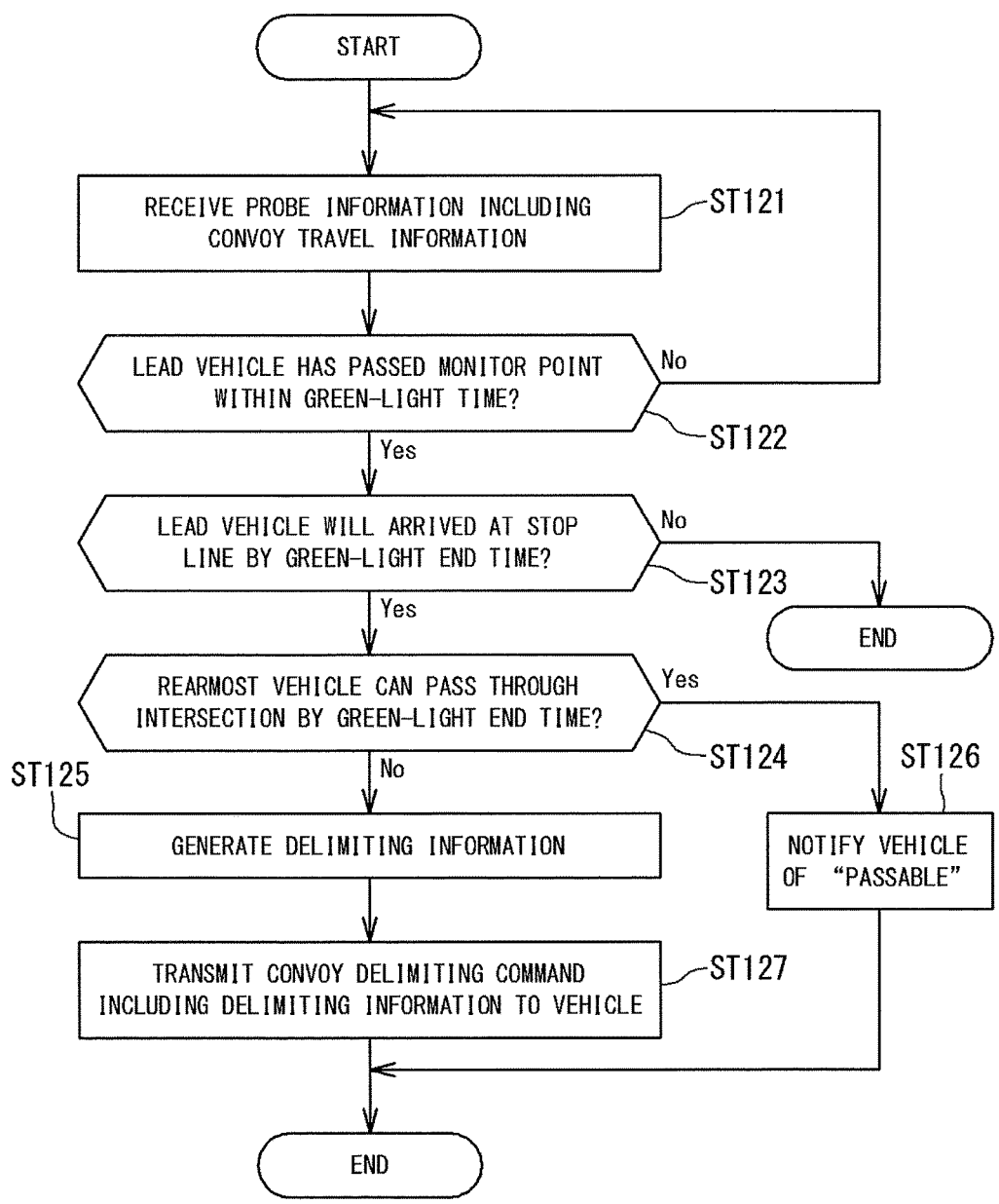
FIG. 10 is a flowchart showing processing contents of the first delimiting control.

FIG. 10 is a flowchart showing processing contents of the first delimiting control.

The IEB 5 executes the process steps of the flowchart shown in FIG. 10 for a plurality of inflow roads (in the east-to-west direction and the south-to-north direction, for example) of an intersection Jk that the IEB 5 covers.

In this example, the inflow road in the east-to-west direction is assumed. Upon receiving probe information including convoy travel information from an equipped vehicle 43A that travels on the inflow road in the east-to-west direction (step ST121), the IEB 5 determines whether or not a lead vehicle has passed a "monitor point" within the present green interval included in the probe information (step ST122).

The monitor point is a virtual point stored in the IEB 5 in advance, and is located at a position away from the stop line of the intersection Jk by a predetermined monitoring distance (e.g., 150 m), for example.

When the result of the determination in step ST122 is negative, the IEB 5 returns the processing back to the step prior to step ST121. That is, the IEB 5 continues to receive probe information until detecting passage of the lead vehicle through the monitor point.

When the result of the determination in step ST122 is positive, the IEB 5 determines whether or not the lead vehicle will arrive at the stop line by the green-light end time (step ST123).

The determination in step ST123 is performed by, for example, comparing a product between a remaining green interval Tr at the moment when the lead vehicle has passed the monitor point and a vehicle speed V, with a monitoring distance Lk.

Specifically, when Tr×V≥Lk, the IEB 5 determines that the lead vehicle will arrive at the stop line. When Tr×V<Lk, the IEB 5 determines that the lead vehicle will not arrive at the stop line.

The vehicle speed V in this case may be a predetermined fixed value, or may be the vehicle speed included in the probe information received from the vehicle platoon 43G.

When the result of the determination in step ST123 is negative, the IEB 5 ends the processing.

The reason is as follows. If the lead vehicle in the vehicle platoon 43G cannot arrive at the stop line of the intersection Jk, all the equipped vehicles 43A included in the vehicle platoon 43G stop at a red light in front of the stop line, and therefore there is no need to delimit the vehicle platoon 43G.

When the result of the determination in step ST123 is positive, the IEB 5 further determines whether or not the rearmost vehicle can pass through the intersection by the green-light end time (step ST124).

The determination in step ST124 is performed by, for example, comparing a product between the remaining green interval Tr at the moment when the lead vehicle has passed the monitor point and the vehicle speed V, with a sum of the monitoring distance Lk, an intersection internal distance Lj, and a vehicle platoon length Lg.

Specifically, when Tr×V≥Lk+Lj+Lg, the IEB 5 determines that the rearmost vehicle can pass through the intersection Jk. When Tr×V<Lk+Lj+Lg, the IEB 5 determines that the rearmost vehicle cannot pass through the intersection.

The intersection internal distance Lj is stored in the storage unit 57 of the IEB 5 in advance. The vehicle platoon length Lg can be calculated on the basis of information such as the number of vehicles in the vehicle platoon 43G, which is included in the probe information.

For example, the IEB 5 calculates the vehicle platoon length Lg on the basis of a product between an average vehicle length that is previously stored therein as a fixed value and the number of vehicles included in the probe information. If the vehicle lengths of the respective equipped vehicles 43A constituting the vehicle platoon 43G are included in the probe information, the IEB 5 may calculate the vehicle platoon length Lg by summing up the vehicle lengths.

When the IEB 5 does not perform the convoy priority control (FIG. 8) in parallel with the first delimiting control, the IEB 5 adopts, as the green-light end time used for the determination in step ST124, the end time of the ordinary green interval that is not extended by the convoy priority control.

On the other hand, when the IEB 5 performs the convoy priority control (FIG. 8) in parallel with the first delimiting control, the IEB 5 adopts, as the green-light end time used for the determination in step ST124, the end time of the green interval that is extended by the convoy priority control.

When the result of the determination in step ST124 is positive, the IEB 5 transmits, by roadside-to-vehicle communication, a communication frame including a notification that all the equipped vehicles 43A included in the vehicle platoon 43G can pass through the intersection Jk, to part or all of the equipped vehicles 43A (step ST126). Thereafter, the IEB 5 ends the processing.

Thus, the equipped vehicles 43A constituting the vehicle platoon 43G are allowed to know, in advance, that the whole of the vehicle platoon 43G traveling in a convoy can pass through the intersection Jk at the green-light.

When the result of the determination in step ST124 is negative, the IEB 5 generates "delimiting information" between the preceding vehicles 43Gx and the following vehicles 43Gy (step ST125).

The delimiting information is, when one vehicle platoon 43G is separated into a platoon of preceding vehicles 43Gx and a platoon of following vehicles 43Gy, information by which an equipped vehicle 43A corresponding to the boundary between the platoons can be specified. As the delimiting information, one of pieces of delimiting information 1 to 4 below can be adopted.

Delimiting information 1: the number of preceding vehicles 43Gx;

Delimiting information 2: intra-platoon identification information or a vehicle ID of a rearmost vehicle among the preceding vehicles 43Gx;

Delimiting information 3: the number of following vehicles 43Gy; and

Delimiting information 4: intra-platoon identification information or a vehicle ID of a lead vehicle among the following vehicles 43Gy.

The IEB 5 calculates a delimitation position X from the head of the vehicle platoon 43G by using a calculation formula of $X=(Lk+Lj+Lg)-(Tr \times V)$, and extracts, as a rearmost vehicle among the preceding vehicles 43Gx, an equipped vehicle 43A that is away from the calculated delimitation position X in the downstream direction and that is closest to the delimitation position X.

On the basis of the intra-platoon identification information of the extracted rearmost vehicle, the IEB 5 generates delimiting information that is any one of the pieces of delimiting information 1 to 4 described above. The IEB 5 may notify the vehicle side of the delimitation position X itself by roadside-to-vehicle communication to cause the equipped vehicle 43A to generate any one of the pieces of delimiting information 1 to 4.

Next, the IEB 5 transmits, by roadside-to-vehicle communication, a communication frame of a convoy delimiting command including the delimiting information to part or all of the equipped vehicles 43A (step ST127). Thereafter, the IEB 5 ends the processing.

Thus, the equipped vehicles 43A constituting the vehicle platoon 43G is allowed to know, in advance, which vehicle is at the end of the platoon of the preceding vehicles 43Gx that can pass through the intersection Jk this time and which vehicle is at the head of the platoon of the following vehicles 43Gy that will pass through the intersection Jk next time, among the vehicle platoon 43G traveling in a convoy.

For example, it is assumed that a lead vehicle among vehicles traveling in a convoy serves as a master vehicle which instructs permission, cancellation, and the like of the convoy to other vehicles. In addition, as shown in FIG. 9(*a*), it is assumed that six vehicles from the head are preceding vehicles 43Gx while three remaining vehicles are following vehicles 43Gy.

In this case, upon receiving the convoy delimiting command from the IEB 5, the lead vehicle transmits, by vehicle-to-vehicle communication, a convoy travel cancellation command to a seventh equipped vehicle 43A (a lead vehicle among the following vehicles 43Gy) from the head.

Upon receiving the cancel command, the seventh equipped vehicle 43A cancels inter-vehicle control such as CACC to the sixth equipped vehicle 43A. Therefore, the vehicle platoon 43G is separated into a platoon of the six preceding vehicles 43Gx from the head and a platoon of the remaining three following vehicles 43Gy.

After the separation, the seventh equipped vehicle 43A serves as a master vehicle for the following vehicles 43Gy. When the following vehicles 43Gy approach the preceding vehicles 43Gx again and are permitted to join the convoy by the lead vehicle of the preceding vehicles 43Gx, the convoy is restored to the original vehicle platoon 43G including nine vehicles.

[Processing Contents of Second Delimiting Control]

Figure 11:
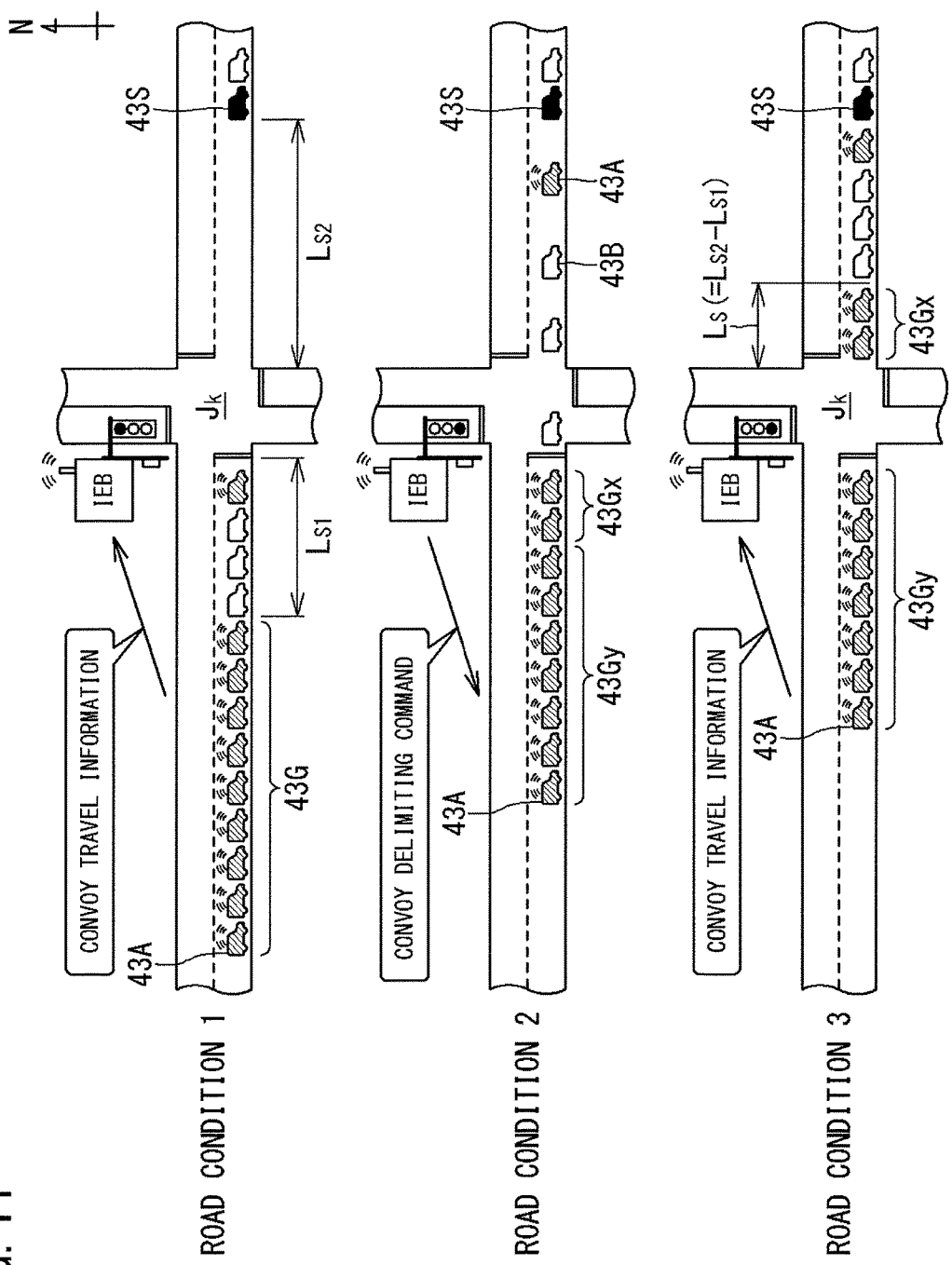
FIG. 11 is an explanatory diagram time-sequentially showing an example of change in a road condition according to the second delimiting control.
Figure 12:
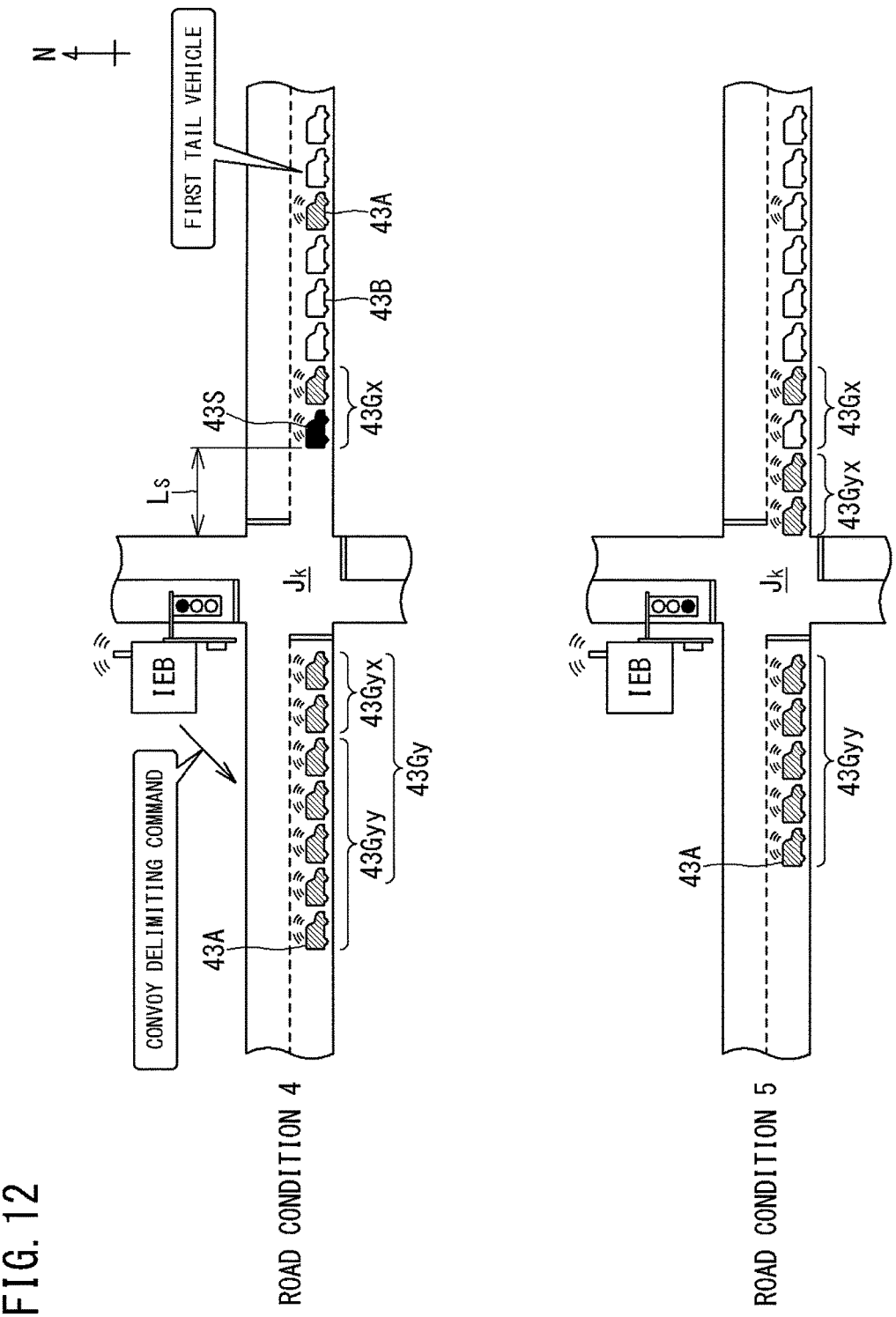
FIG. 12 is an explanatory diagram (following FIG. 11) time-sequentially showing the example of change in the road condition according to the second delimiting control.

FIG. 11 and FIG. 12 are explanatory diagrams showing examples of changes in road conditions in the case where the IEB 5 executes the second delimiting control. FIG. 12 shows the road conditions that follow FIG. 11.

Figure 13:
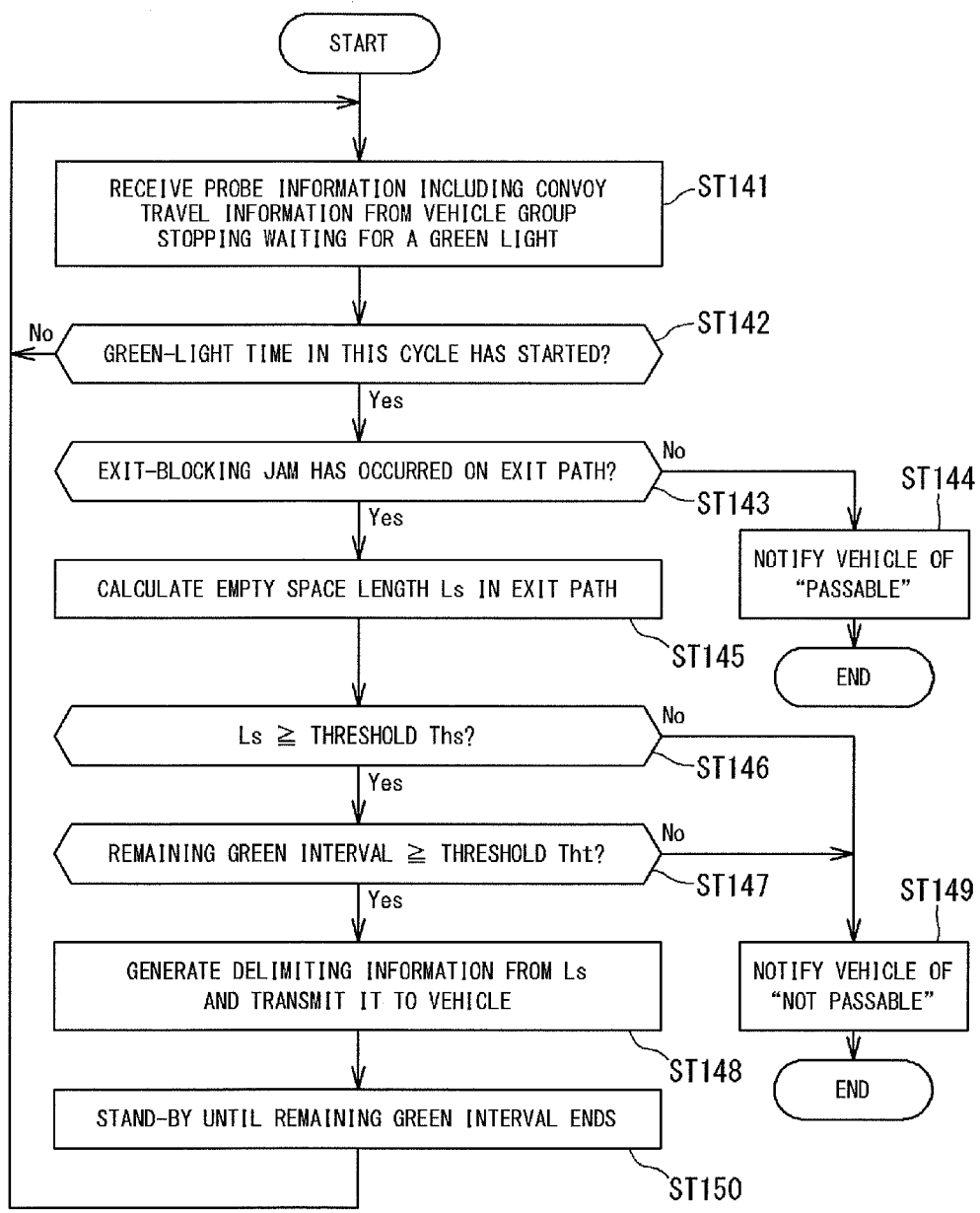
FIG. 13 is a flowchart showing processing contents of the second delimiting control.

FIG. 13 is a flowchart showing processing contents of the second delimiting control in detail. Hereinafter, the processing contents of the second delimiting control will be described with reference to FIG. 11 to FIG. 13.

Road condition 1 in FIG. 11 shows a state in which a vehicle platoon 43G traveling in a convoy is stopping at a red light in front of an intersection Jk.

In FIG. 11, "Ls1" indicates a length of a first zone from the head of the vehicle platoon 43G to a stop line of the intersection Jk, and "Ls2" indicates a zone length of a second zone from an upstream end of an exit road to a tail vehicle 43S in an exit-blocking jam. In addition, "Ls" indicates a length of an empty space in the exit road, which can be assigned to the vehicle platoon 43G.

Road condition 2 in FIG. 11 shows a state in which a traffic signal at the intersection Jk turns to a green light after the road condition 1, and vehicles 43 that have existed in the range of a first zone length Ls1 move toward the exit road.

Road condition 3 in FIG. 11 shows a state in which preceding vehicles 43Gx of the vehicle platoon 43G fall in the empty space length Ls detected by the IEB 5 in the first second delimiting control.

Road condition 4 in FIG. 12 shows a state in which the traffic signal at the intersection Jk turns to a red light after the road condition 3, and following vehicles 43Gy of the vehicle platoon 43G are stopping at the red light in front of the intersection Jk.

In the road condition 4 shown in FIG. 12, the exit-blocking jam on the exit road advances to the downstream side during the second red light after the road condition 3, whereby a new empty space length Ls is formed.

In FIG. 12, "43Gyx" and "43Gyy" indicate preceding vehicles and following vehicles, respectively, which have been included in the vehicle platoon 43Gy as the following vehicles left in the first convoy delimiting control and are separated by the second convoy delimiting control.

Road condition 5 in FIG. 12 indicates a state in which the preceding vehicles 43Gyx of the vehicle platoon 43Gy fall in the empty space length Ls detected by the IEB 5 in the second convoy delimiting control.

The IEB 5 executes the process steps of the flowchart shown in FIG. 13, for a plurality of inflow roads (in the east-to-west direction and the south-to-north direction, for example) of an intersection Jk that the IEB 5 covers.

In this example, the inflow road in the east-to-west direction is assumed. Upon receiving probe information including convoy travel information from the vehicle platoon 43G that is stopping, waiting for a traffic light to change, on the inflow road in the east-to-west direction (step ST141), the IEB 5 determines whether or not green interval in this cycle has started (step ST142).

When the result of the determination in step ST142 is negative, the IEB 5 returns the processing back to a step prior to step ST141. That is, the IEB 5 continues to receive the probe information until detecting start of green interval in this cycle.

When the result of the determination in step ST142 is positive, the IEB 5 determines whether or not an exit-blocking jam that inhibits exit of the vehicle platoon 43G from the intersection Jk has occurred on the exit road of the intersection Jk (step ST143).

The determination in step ST143 can be performed by, for example, analyzing image data taken by a monitor camera (roadside detector 44) having, as an imaging target, an upstream portion of the exit road.

In a case where an equipped vehicle 43A is configured to monitor stoppage of a forward vehicle 43 from an image taken by a camera provided in the equipped vehicle 43A and cause probe information to include this monitor information, the IEB 5 may perform the determination in step ST143 by using the monitor information notified by the equipped vehicle 43A.

For example, in the road condition 1 shown in FIG. 11, in a case where an equipped vehicle 43A at the head of the queue of vehicles waiting for a traffic light to change (an equipped vehicle 43A closest to the stop line) monitors stoppage of a tail vehicle 43S existing on the exit road, the equipped vehicle 43A at the head may cause probe information to include the monitor information and transmit the probe information to the IEB 5.

In this case, the IEB 5 can detect occurrence of an exit-blocking jam on the exit road on the basis of the monitor information included in the probe information received from the equipped vehicle 43A at the head of the queue of vehicles waiting for a traffic light to change.

When the result of the determination in step ST143 is negative, the IEB 5 transmits, by roadside-to-vehicle communication, a communication frame including a notification that all the equipped vehicles 43A in the vehicle platoon 43G can pass through the intersection Jk, to part or all of the equipped vehicles 43A (step ST144). Thereafter, the IEB 5 ends the processing.

Thus, the equipped vehicles 43A constituting the vehicle platoon 43G can know, in advance, that the whole of the vehicle platoon 43G traveling in a convoy can pass through the intersection Jk without encountering an exit-blocking jam.

When the result of the determination in step ST143 is positive, the IEB 5 calculates the empty space length Ls of the exit road (step ST145).

Specifically, the IEB 5 calculates the empty space length Ls by subtracting the first zone length Ls1 from a second zone length Ls2. The first zone length Ls1 can be calculated on the basis of the vehicle position of the lead vehicle of the vehicle platoon 43G and the position of the stop line (refer to road condition 1 of FIG. 11). If the vehicle platoon 43G is at the head of the queue of vehicles waiting for a traffic light to change, the value of the first zone length Ls1 is 0.

In a case where an exit-blocking jam is determined from image data taken by the roadside detector 44 composed of a monitor camera, the second zone length Ls2 can be acquired from the result of analysis of the image data.

In a case where a lead equipped vehicle 43A at the head of the queue of vehicles waiting for a traffic light to change (an equipped vehicle 43A closest to the stop line) notifies the IEB 5 of an inter-vehicle distance to the tail vehicle 43S, the second zone length Ls2 can be calculated by subtracting the internal distance Lj of the intersection Jk from the notified inter-vehicle distance.

Next, the IEB 5 determines whether or not the empty space length Ls is greater or equal to a predetermined threshold Ths (step ST146).

The predetermined threshold Ths is set to, for example, an average space headway d of vehicles 43 or a value obtained by multiplying the average space headway d by a predetermined margin rate greater than 1.

Next, the IEB 5 determines whether or not the remaining green interval at the present moment is longer than or equal to the threshold Tht (step ST147).

The predetermined threshold Tht is set to, for example, an average passage time in a case where a vehicle 43 that is stopping, waiting for a traffic light to change, at a predetermined position in front of the intersection Jk passes through the intersection Jk during a green light.

When the result of the determination in step ST146 is negative and when the result of the determination in step ST147 is negative, the IEB 5 transmits, by roadside-to-vehicle communication, a communication frame including a notification that any vehicle 43 cannot pass through the intersection Jk, to part or all of the equipped vehicles 43A (step ST149). Thereafter, the IEB 5 ends the processing.

Thus, the equipped vehicles 43A constituting the vehicle platoon 43G can know, in advance, that none of the vehicles of the vehicle platoon 43G can pass through the intersection Jk.

When the result of the determination in step ST147 is positive, the IEB 5 generates "delimiting information" between the preceding vehicles 43Gx and the following vehicles 43Gy (step S148).

Specifically, the IEB 5 adopts the empty space length Ls as the delimitation position X from the head of the vehicle platoon 43G, and extracts, as a rearmost vehicle among the preceding vehicles 43Gx, a closest equipped vehicle 43A that is away from the calculated delimitation position X in the downstream direction.

On the basis of the intra-platoon identification information of the extracted rearmost vehicle, the IEB 5 generates delimiting information that is any one of the pieces of delimiting information 1 to 4 described above. The IEB 5 may notify the vehicle side of the delimitation position X itself by roadside-to-vehicle communication to cause the equipped vehicle 43A to generate any one of the pieces of delimiting information 1 to 4.

Then, the IEB 5 transmits, by roadside-to-vehicle communication, a communication frame of a convoy delimiting command including the generated delimiting information to part or all of the equipped vehicles 43A (step ST148).

Thus, the equipped vehicles 43A constituting the vehicle platoon 43G can know, in advance, which vehicle is at the end of the platoon of the preceding vehicles 43Gx that can pass through the intersection Jk this time and which vehicle is at the head of the platoon of the following vehicles 43Gy that will pass through the intersection Jk next time, among the vehicle platoon 43G traveling in a convoy.

After executing step ST148, the IEB 5 stands by until the remaining green interval ends (step ST150), and then returns the processing back to a step prior to step S141.

Therefore, calculation of an empty space length Ls of the exit road (step S145) and generation of delimiting information based on the empty space length Ls (step ST148) are repeated for each cycle. This is because, as indicated by the road conditions 3 and 4, an empty space length Ls can be newly generated if the exit-blocking jam advances in the downstream direction during a red interval.

For example, it is assumed that a lead vehicle among vehicles traveling in a convoy serves as a master vehicle which instructs permission, cancel, and the like of the convoy to other vehicles.

Further, as shown in FIG. 11, it is assumed that, in the first-time second delimiting control, two vehicles from the head of the vehicle platoon 43G are preceding vehicles 43Gx while seven remaining vehicles are following vehicles 43Gy. Further, as shown in FIG. 12, it is assumed that, in the second-time second delimiting control, two vehicles from the head of the vehicle platoon 43Gy are preceding vehicles 43Gyx while five remaining vehicles are following vehicles 43Gyy.

In this case, in the road condition 1, when the IEB 5 has performed the first-time second delimiting control and transmitted the convoy delimiting command, the lead vehicle, in the vehicle platoon 43G, that has received the convoy delimiting command transmits, by vehicle-to-vehicle communication, a convoy travel cancellation command to the third equipped vehicle 43A from the head (the lead vehicle among the following vehicle 43Gy).

Upon receiving the cancel command, the third equipped vehicle 43A cancels inter-vehicle control such as CACC to the second equipped vehicle 43A. Therefore, the vehicle platoon 43G is separated into a platoon of two preceding vehicles 43Gx from the head and a platoon of seven remaining following vehicles 43Gy.

After the separation, as indicated in the road condition 3, the third equipped vehicle 43A serves as a master vehicle for the seven following vehicles 43Gy, and the seven equipped vehicles 43A form a vehicle platoon 43Gy traveling in a convoy.

Next, in the road condition 4, when the IEB 5 has performed the second-time second delimiting control and transmitted a convoy delimiting command, the lead vehicle, in the vehicle platoon 43Gy, that has received this convoy delimiting command transmits, by vehicle-to-vehicle communication, a convoy travel cancellation command to the third equipped vehicle 43A from the head (the lead vehicle among the following vehicles 43Gyy).

Upon receiving the cancel command, the third equipped vehicle 43A cancels inter-vehicle control such as CACC to the second equipped vehicle 43A. Therefore, the vehicle platoon 43Gy is separated into a platoon of two preceding vehicles 43Gxy from the head and a platoon of five remaining following vehicles 43Gyy.

After the separation, as indicated in the road condition 5, the third equipped vehicle 43A serves as a master vehicle for the five following vehicles 43Gyy, and the five equipped vehicles 43A form a vehicle platoon 43Gyy traveling in a convoy.

[Outline of Calculation of On-Vehicle Apparatus Equipping Rate]

Figure 14A:
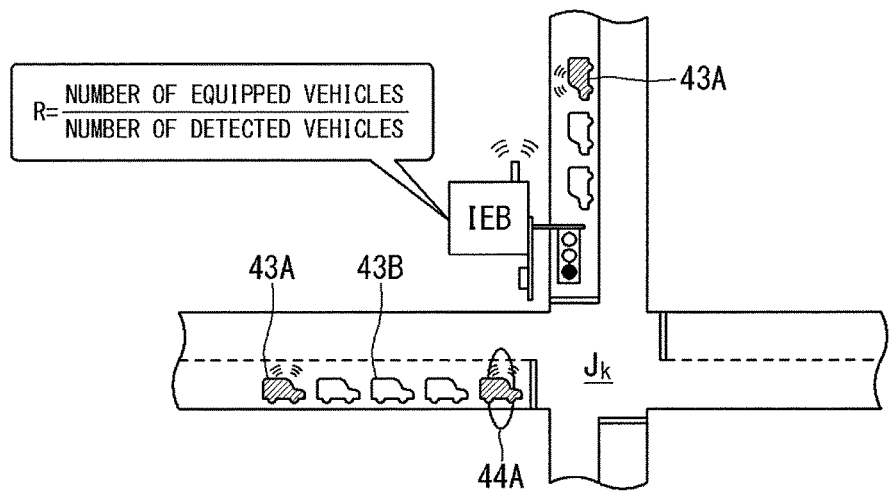
FIG. 14(a) is an explanatory diagram showing an outline of first calculation process.
Figure 14B:
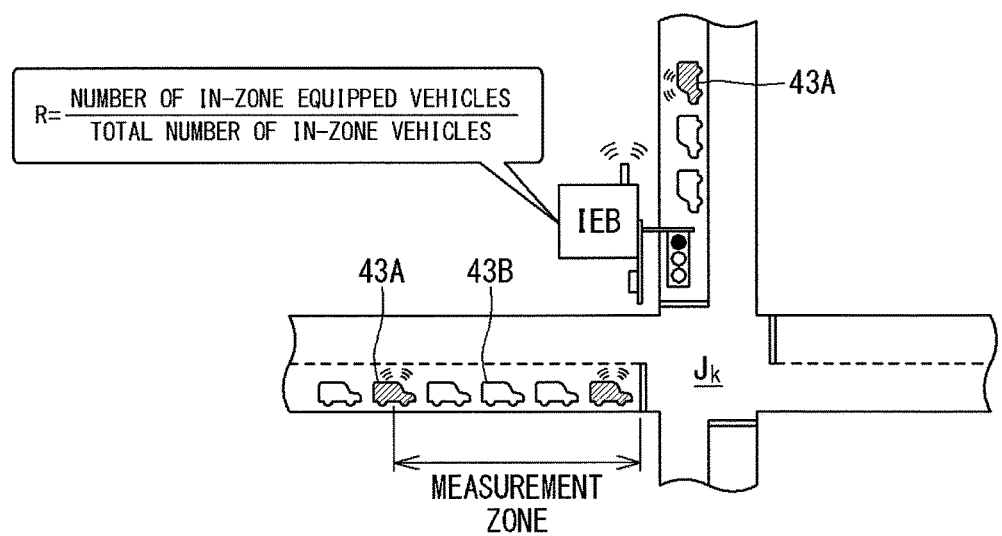
FIG. 14(b) is an explanatory diagram showing an outline of a second calculation process.

FIG. 14(*a*) and FIG. 14(*b*) show calculation processes of calculating two types of on-vehicle apparatus equipping rates, which can be executed by the IEB 5. FIG. 14(*a*) is an explanatory diagram showing an outline of a first calculation process. FIG. 14(*b*) is an explanatory diagram showing an output of a second calculation process.

The on-vehicle apparatus equipping rate (hereinafter also referred to simply as "equipping rate") R is a rate calculated by dividing the number of all vehicles traveling by the number of equipped vehicles 43A traveling.

Therefore, when the number of equipped vehicles 43A has been determined from the number of vehicle IDs collected from a plurality of pieces of probe infatuation, the actual traffic volume can be estimated by dividing the number of equipped vehicles by the equipping rate R.

The equipping rate R is highly likely to vary among different regions. In addition, the equipping rate R periodically varies, for example, varies depending on day of week or time of day, and it is considered that the equipping rate R may gradually increase in the long term with an increase in the ownership rate of the on-vehicle communication apparatus 42. Therefore, in estimating the actual traffic volume from the probe information, it is essential for the IEB 5 to measure the equipping rate R in each region at the present moment.

The first calculation process shown in FIG. 14(*a*) is a calculation process that uses the roadside detector 44 composed of a vehicle detector, while the second calculation process shown in FIG. 14(*b*) is a calculation process that does not use the roadside detector 44 composed of a vehicle detector.

In these figures, reference numeral 44A denotes a detection area in which the roadside detector 44 composed of a vehicle detector detects vehicles 43 one by one.

In the first calculation process shown in FIG. 14(*a*), the IEB 5 calculates the equipping rate R on the basis of a calculation formula of "equipping rate R=number of equipped vehicles/number of detected vehicles".

The "number of detected vehicles" is the number of vehicles that have passed through the detection area 44A and detected by the vehicle detector within a predetermined monitoring period. The number of "equipped vehicles" is the number of equipped vehicles (probe vehicles) 43A that are estimated to pass through the detection area 44A within the same monitoring period, on the basis of the vehicle position and temporal information included in the probe information.

Thus, at the intersection Jk where the vehicle detector is installed, the traffic volume of all vehicles 43 can be obtained by the number of detected vehicles, it is possible to easily calculate the equipping rate R by dividing the number of equipped vehicles in the predetermined monitoring period by the number of detected vehicles in the same monitoring period.

However, since the first calculation process uses the number of detected vehicles, this process cannot be applied to an intersection Jk where a vehicle detector is not installed.

Meanwhile, in the second calculation process shown in FIG. 14(*b*), the IEB 5 calculates the equipping rate R by using a calculation formula of "equipping rate R=number of in-zone equipped vehicles/total number of in-zone vehicles". In this case, even at an intersection Jk where a vehicle detector is not installed, it is possible to calculate the equipping rate R.

The "number of in-zone equipped vehicles" is the number of equipped vehicles 43A that exist in a predetermined "measurement zone" included in a waiting queue formed on the inflow road. The "total number of in-zone vehicles" is the total number of vehicles 43 that exist in the "measurement zone".

[An Example of Calculation Method in Second Calculation Process]

Figure 15:
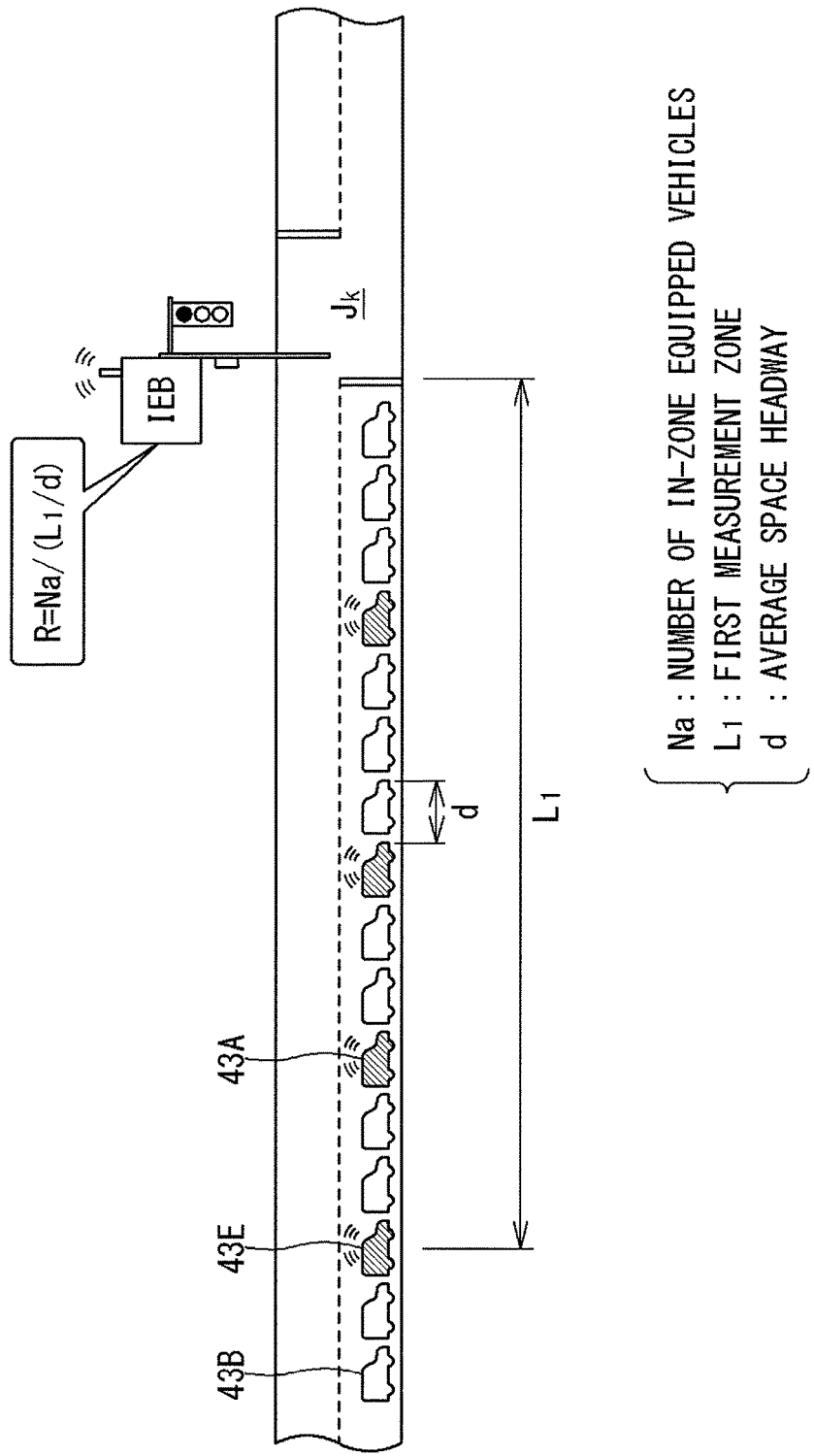
FIG. 15 is an explanatory diagram showing calculation method 1 in the second calculation process.
Figure 16:
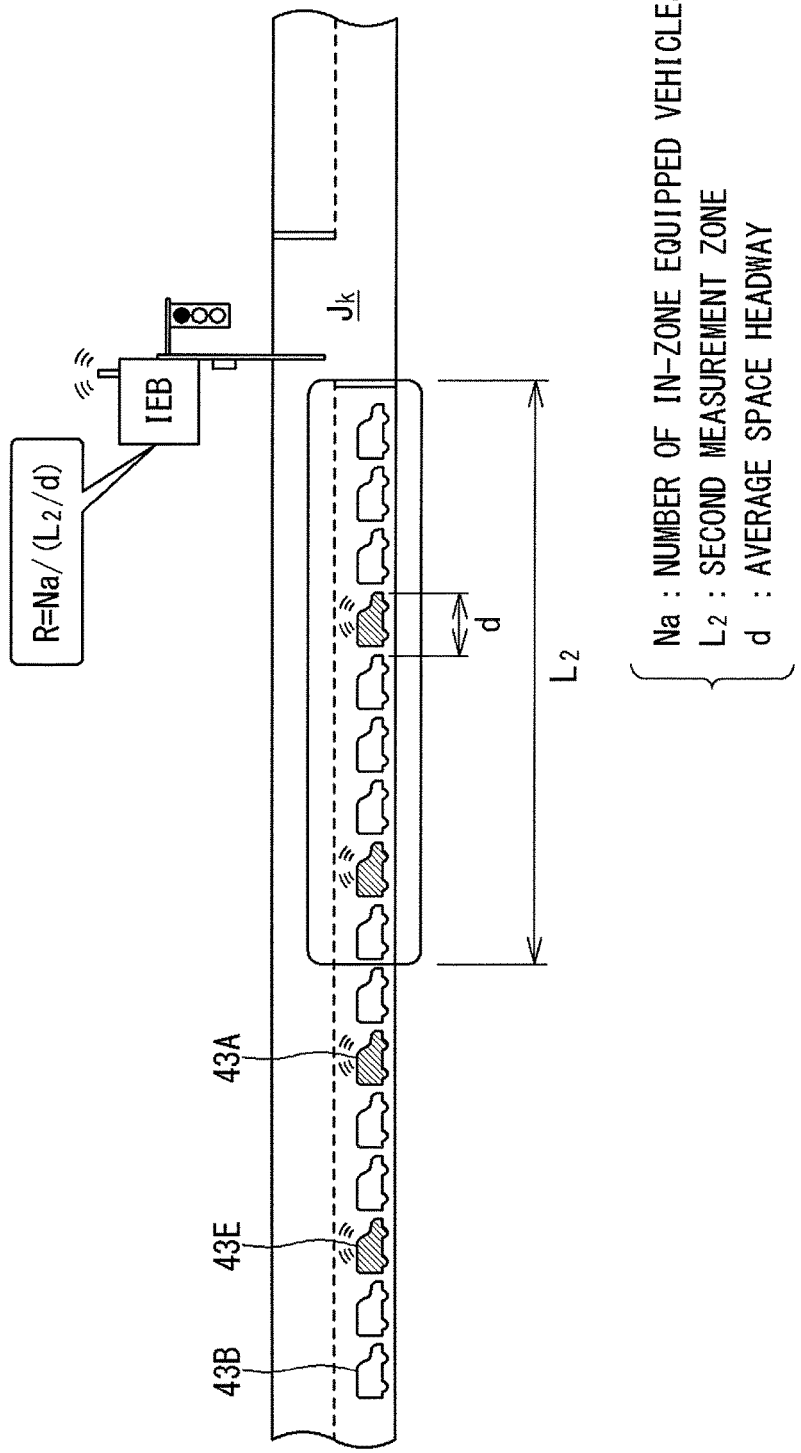
FIG. 16 is an explanatory diagram showing calculation method 2 in the second calculation process.
Figure 17:
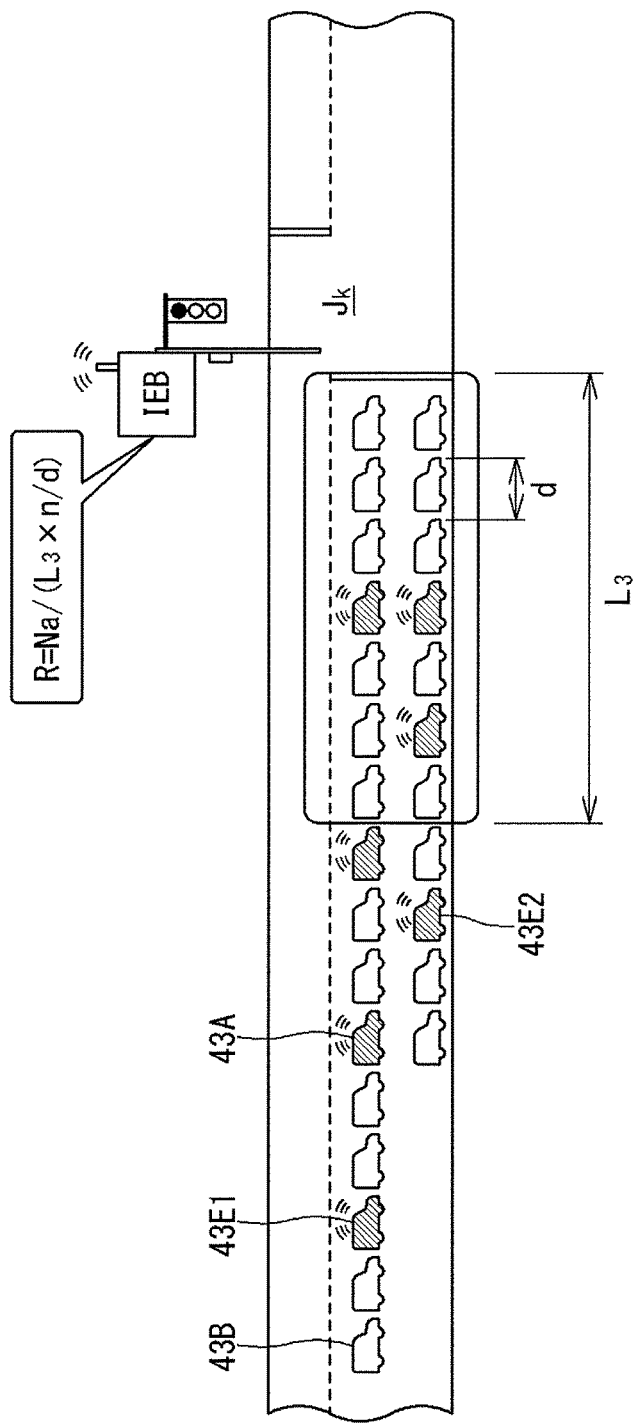
FIG. 17 is an explanatory diagram showing calculation method 3 in the second calculation process.

In the second calculation process using the above-described calculation formula, a plurality of types of calculation methods 1 to 3 shown in FIG. 15 to FIG. 17 can be adopted depending on how the "measurement zone" in the inflow road is defined.

In FIG. 15 to FIG. 17, "Na" is the number of in-zone equipped vehicles, "d" is an average space headway when vehicles are waiting for a traffic light to change, and "L1 to L3" are measurement zones used for the respective calculation methods 1 to 3.

FIG. 15 is an explanatory diagram showing the calculation method 1 in the second calculation process.

The measurement zone used for the calculation method 1 is a first measurement zone L1 shown in FIG. 15. A downstream end of the first measurement zone L1 is a stop line of an inflow road. An upstream end of the first measurement zone L1 is a stop position of a rearmost vehicle 43E among the equipped vehicles 43A included in a waiting queue on the inflow road.

In a case where the calculation method 1 is adopted, upon receiving probe information from one or a plurality of equipped vehicles 43A that are stopping, waiting for a traffic light to change, on the inflow road of the intersection Jk, the IEB 5 specifies the vehicle position of the rearmost vehicle 43E on the most upstream side, from among the vehicle positions of the one or the plurality of equipped vehicles 43A.

Thereafter, the IEB 5 calculates the length of the first measurement zone L1 from the vehicle position of the rearmost vehicle 43E to the stop line.

Next, the IEB 5 assumes that the number of equipped vehicles 43A (4 in FIG. 15) positioned in the first measurement zone L1 is the number Na of in-zone equipped vehicles. Further, the IEB 5 estimates that a value (14 in FIG. 15) obtained by dividing the zone length of the first measurement zone L1 by the average space headway d is the total number of in-zone vehicles.

Then, the IEB 5 divides the number Na of in-zone equipped vehicles by the estimated total number of in-zone vehicles to calculate the equipping rate R. That is, the IEB 5 calculates the equipping rate R on the basis of a calculation formula of R=Na/(L1/d).

In the calculation process 1, selection of the vehicle position of the rearmost vehicle 43E is preferably performed from among the vehicle positions having errors less than or equal to a predetermined threshold, on the basis of vehicle position precision information included in the probe information (e.g., a GPS reliability index included in the probe information).

Thus, the precision of the zone length of the first measurement zone L1 is improved, whereby the precision of the equipping rate R calculated using the zone length is also improved.

FIG. 16 is an explanatory diagram showing the calculation method 2 in the second calculation process.

The measurement zone used for the calculation method 2 is the second measurement zone L2 shown in FIG. 16. A downstream end of the second measurement zone L2 is the stop line of the inflow road. An upstream end of the second measurement zone L2 is a position away from the downstream end to the upstream side by a predetermined distance (e.g., 150 m). However, the second measurement zone L2 is determined on condition that the upstream end thereof is on the downstream side relative to the stop position of the rearmost vehicle 43E among the equipped vehicles 43A included in the waiting queue on the inflow road.

In a case where the calculation method 2 is adopted, upon receiving probe information from one or a plurality of equipped vehicles 43A that are stopping, waiting for a traffic light to change, on the inflow road of the intersection Jk, the IEB 5 specifies the vehicle position of the rearmost vehicle 43E on the most upstream side, from among the vehicle positions of the one or the plurality of equipped vehicles 43A.

Thereafter, the IEB 5 determines whether or not the upstream end of the second measurement zone L2 is on the downstream side relative to the vehicle position of the rearmost vehicle 43E. The IEB 5 executes the calculation based on the second measurement zone L2 when the result of the determination is positive, and does not execute calculation when the result of the determination is negative.

Next, the IEB 5 assumes that the number of equipped vehicles 43A (2 in FIG. 16) positioned in the second measurement zone L2 is the number Na of in-zone equipped vehicles. Further, the IEB 5 estimates that a value (9 in FIG. 16) obtained by dividing the zone length of the second measurement zone L2 by the average space headway d is the total number of in-zone vehicles.

Then, the IEB 5 divides the number Na of in-zone equipped vehicles by the estimated total number of in-zone vehicles to calculate the equipping rate R. That is, the IEB 5 calculates the equipping rate R on the basis of a calculation formula of R=Na/(L2/d).

In the calculation method 1, since the upstream end of the first measurement zone L1 is aligned with the stop position of the rearmost vehicle 43E which is an equipped vehicle 43A, the rearmost vehicle 43E is always counted as an equipped vehicle 43A. Therefore, the equipping rate R is likely to be higher than an actual rate.

As a workaround for this problem, it is conceivable to shift the upstream end of the measurement zone toward the "upstream side" from the stop position of the rearmost vehicle 43E. However, since presence/absence of a non-equipped vehicle 43B cannot be estimated on the upstream side of the rearmost vehicle 43E, it is not possible to define the upstream end of the measurement zone.

Therefore, in the calculation method 2, the second measurement zone L2 is determined on condition that the upstream end thereof is positioned on the "downstream side" from the stop position of the rearmost vehicle 43E. The reason is as follows. Since the rearmost vehicle 43E is included in the waiting queue at the intersection Jk, it is conceivable that an equipped vehicle 43A or a non-equipped vehicle 43B surely exists on the downstream side of this vehicle 43E.

According to the calculation method 2, since inevitable alignment between the upstream end of the second measurement zone L2 and the stop position of the rearmost vehicle 43E can be avoided, the equipping rate R can be calculated more precisely as compared to the calculation method 1.

FIG. 17 is an explanatory diagram showing a calculation method 3 in the second calculation process.

The calculation method 3 shown in FIG. 17 is obtained by applying the calculation method 2 shown in FIG. 16 to a road having multiple lanes. A measurement zone is a third measurement zone L3 shown in FIG. 17.

A downstream end of the third measurement zone L3 is a stop line of an inflow road. An upstream end of the third measurement zone L3 is a position away from the downstream end to the upstream side by a predetermined distance (e.g., 150 m). The third measurement zone L3 is determined on condition that the upstream end thereof is on the downstream side of rearmost vehicles 43E1 and 43E2 in all the lanes, among equipped vehicles 43A included in waiting queues on the inflow road of the multiple lanes.

Specifically, assuming that the rearmost vehicle 43E1 is on one of the lanes while the rearmost vehicle 43E2 is on the other lane, the upstream end of the third measurement zone L3 needs to be positioned on the further downstream side relative to the downstream-side rearmost vehicle 43E2.

In a case where the calculation method 3 is adopted, upon receiving probe information from one or a plurality of equipped vehicles 43A that are stopping, waiting for a traffic light to change, on the inflow road of the intersection Jk, the IEB 5 specifies, for the respective lanes, the vehicle positions of the rearmost vehicles 43E1 and 43E2 on the most upstream side, from among the vehicle positions of the one or the plurality of equipped vehicles 43A.

Thereafter, the IEB 5 determines whether or not the upstream end of the third measurement zone L3 is on the downstream side relative to the vehicle position of the rearmost vehicle 43E2. The IEB 5 executes calculation based on the third measurement zone L3 when the result of the determination is positive, and does not execute calculation when the result of the determination is negative.

Next, the IEB 5 assumes that the number of equipped vehicles 43A (3 in FIG. 17) positioned in the third measurement zone L3 is the number Na of in-zone equipped vehicles. Further, the IEB 5 estimates that a value (14 in FIG. 17) obtained by multiplying, by the number of lanes (2 in FIG. 17), a value (7 in FIG. 17) obtained by dividing the zone length of the third measurement zone L3 by the average space headway d is the total number of in-zone vehicles.

Then, the IEB 5 divides the number Na of in-zone equipped-vehicles by the estimated total number of in-zone vehicles to calculate the equipping rate R. That is, the IEB 5 calculates the equipping rate R on the basis of a calculation formula of $R=Na/(L3 \times n/d)$.

In the above-described calculation methods 1 to 3, the downstream end of each of the measurement zones L1 to L3 need not necessarily be the stop line of the intersection Jk.

For example, the downstream end of each of the measurement zones L1 to L3 may be set at a position on the upstream side from the stop line by the number of vehicles 43, or may be set at the stop position of an equipped vehicle 43A that is positioned on the most downstream side among the equipped vehicles 43A included in the waiting queues.

Further, in the calculation method 1, as the upstream end of the first measurement zone L1, the vehicle position of the rearmost vehicle 43E need not necessarily be adopted. The vehicle position of the second or subsequent equipped vehicle 43A in the downstream direction from the rearmost vehicle 43E may be adopted.

Further, in the calculation methods 2 and 3, the vehicle position used for comparison with the upstream ends of the second and third measurement zones L2 and L3 need not necessarily be the vehicle position of the rearmost vehicle 43E. The vehicle position of the second or subsequent equipped vehicle 43A in the downstream direction from the rearmost vehicle 43E may be adopted.

[Outline of Improvement of Local-Actuated Control]

FIG. 18(a) and FIG. 18(b) show two types of improvement of local-actuated control which can be executed by the IEB 5. FIG. 18(a) is an explanatory diagram showing an outline of improvement of gap-actuated control. FIG. 18(b) is an explanatory diagram showing an outline of improvement of semi-actuated control.

Figure 18:
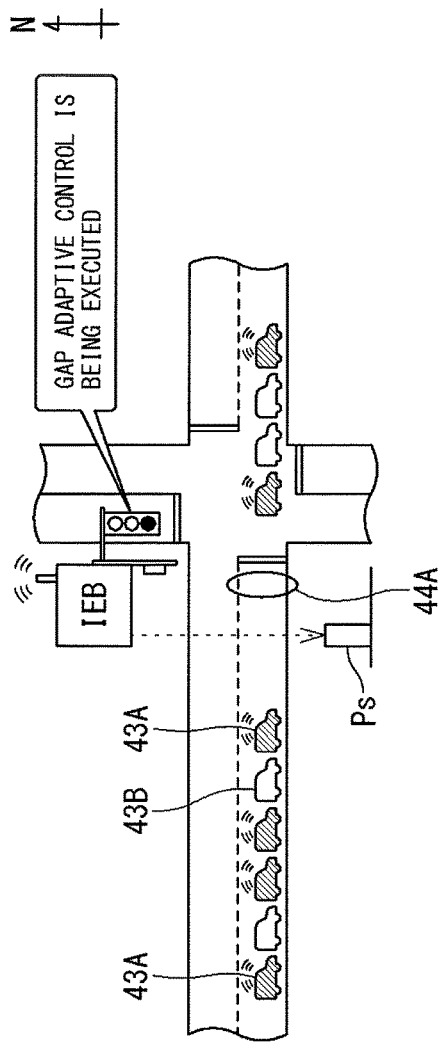
FIG. 18(a) is an explanatory diagram showing an outline of improvement of gap-actuated control.
FIG. 18(b) is an explanatory diagram showing an outline of improvement of semi-actuated control.

In FIG. 18, it is assumed that a roadside detector 44 composed of a vehicle detector that detects vehicles 43 in a detection area 44A is installed at an intersection Jk. In the figure, a reference numeral Ps denotes a emulated pulse signal that the IEB 5 can generate.

At the intersection Jk shown in FIG. 18(a), the traffic signal controller 47 is executing "gap-actuated control" which is a type of local-actuated control.

The gap-actuated control is a control in which a green interval is extended when a time interval (gap) of a detection pulse signal outputted from the vehicle detector installed at an inflow road is equal to or less than a predetermined threshold (e.g., 2 sec), and the green-light extension is aborted when the gap is less than the predetermined threshold.

In the gap-actuated control based on only the detection pulse signal, for example, as shown in FIG. 18(a), when the inter-vehicle distance of vehicles 43 that enter the intersection Jk is greater than a distance equivalent to the gap threshold (=2 sec), extension of the green interval is automatically aborted.

However, even when the inter-vehicle distance between vehicles 43 that enter the intersection Jk is greater than the distance equivalent to the gap threshold, it may be preferable to allow the vehicle 43 immediately after the gap to pass through the intersection Jk at a green light because sudden braking of this vehicle 43 can be prevented and thus safety is secured.

Thus, upon receiving probe information from a following equipped vehicle 43A, the IEB 5 uniquely determines whether or not the following equipped vehicle 43A should be allowed to pass at the green light, on the basis of the vehicle position, the vehicle speed, and the like included in the probe information.

Then, when the result of the determination is positive, the IEB 5 generates a emulated pulse signal Ps before the following equipped vehicle 43A arrives at the detection area 44A, and transmits the generated emulated pulse signal Ps to the traffic signal controller 47.

Therefore, even when the inter-vehicle distance between the following equipped vehicle 43A and a vehicle 43 traveling ahead thereof is greater than the distance equivalent to the gap threshold, the extended green interval allows the following equipped vehicle 43A to pass through the intersection Jk.

Thus, upon receiving probe information from an equipped vehicle 43A, the IEB 5 outputs a emulated pulse signal to the traffic signal controller 47 executing the gap-actuated control, and thereby can substantially extend the gap threshold. Therefore, the IEB 5 can improve the gap-actuated control.

At the intersection Jk shown in FIG. 18(b), the traffic signal controller 47 is executing "semi-actuated control" which is a type of local-actuated control.

The semi-actuated control is a control in which, only when a vehicle detector installed on a minor road (in the east-to-west direction in FIG. 18(b)) detects a vehicle 43, the right of way (green light signal) is given to the minor road, whereas the right of way is continuously given to a main road (in the south-to-north direction in FIG. 18(b)) while the vehicle detector does not detect a vehicle 43.

In the semi-actuated control based on only the detection pulse signal, for example, as shown in FIG. 18(b), the right of way is still on the main road side at the moment when the vehicle 43 has arrived at the detection area 44A near the stop line, and the right of way is transferred to the minor road side when a predetermined time period has passed from the arrival moment.

Therefore, a vehicle 43 traveling on the minor road cannot pass through the intersection Jk unless waiting a predetermined time period after its arrival at the detection area 44A.

Hence, upon receiving probe information from an equipped vehicle 43A traveling on an inflow road of the minor road, the IEB 5 generates a emulated pulse signal Ps before the equipped vehicle 43A arrives at the detection area 44A, and transmits the generated emulated pulse signal Ps to the traffic signal controller 47.

Therefore, the right of way can be given early to the minor road side, and thus the traffic light waiting time of the equipped vehicle 43A traveling the minor road can be reduced.

Thus, upon receiving probe information from an equipped vehicle 43A, the IEB 5 outputs, in advance, a emulated pulse signal to the traffic signal controller 47 executing the semi-actuated control, whereby the traffic light waiting time of the equipped vehicle 43A on the minor road can be reduced. Therefore, the semi-actuated control can be improved.

[Outline of Detector Emulation]

Figure 19:
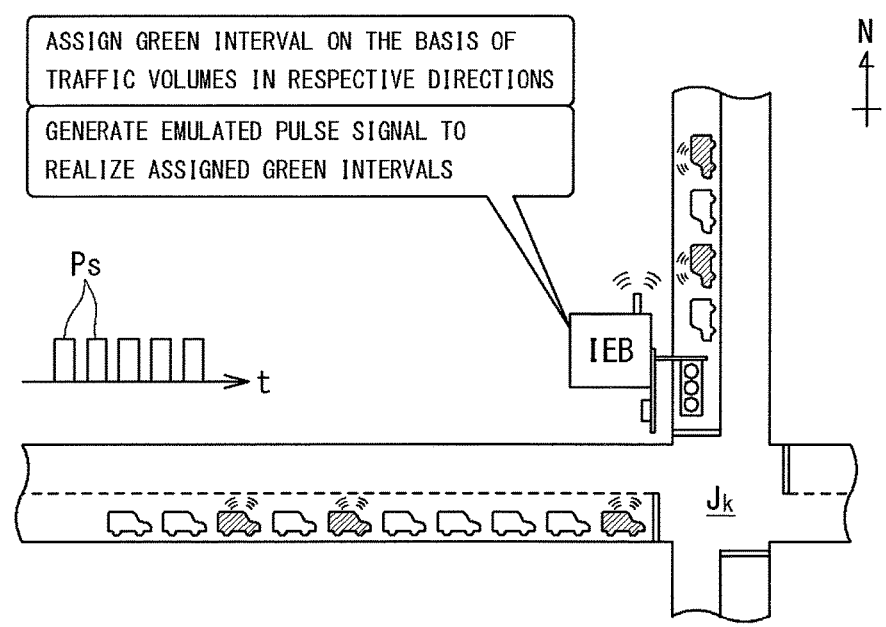
FIG. 19 is an explanatory diagram showing an outline of detector emulation.

FIG. 19 is an explanatory diagram showing an outline of detector emulation.

In FIG. 19, it is assumed that a roadside detector 44 composed of a vehicle detector that detects vehicles 43 in a detection area 44A has not yet been installed at an intersection Jk. In the figure, a reference numeral Ps denotes a emulated pulse signal that the IEB 5 can generate.

Further, at the intersection Jk shown in FIG. 19, the traffic signal controller 47 is able to perform switching between pattern control having no dynamic change of green interval, and local-actuated control, such as gap-actuated control, having extension of green interval.

Even when the traffic signal controller 47 is able to perform switching between the pattern control and the local-actuated control, a roadside detector 44 such as a vehicle detector needs to be installed on the inflow road of the intersection Jk in order to realize the local-actuated control.

However, in order to install a vehicle detector on a road, it is necessary to set up a support on each inflow road, and mount a detector head, for each line, to a beam member provided at an upper end of the support. This work may result in an increase in costs for construction of supports or the like, and adverse effect on scenery around the intersection.

Further, since reconstruction of supports is needed when detection points of the installed vehicle detector need to be adjusted, it is difficult to adjust the detection points.

Hence, the IEB 5 estimates traffic volumes on the inflow roads in the respective directions by using probe information received from equipped vehicles 43A traveling on the inflow roads, and determines green intervals to be assigned to the respective inflow roads on the basis of the estimated traffic volumes.

Then, the IEB 5 generates a plurality of emulated pulse signals Ps to realize the assigned green intervals, and transmits the generated emulated pulse signals Ps to the traffic signal controller 47.

Therefore, the traffic signal controller 47 can execute switching between the pattern control and the local-actuated control on the basis of the emulated pulse signals Ps received from the IEB 5. Thus, the traffic signal controller 47 can execute control switching even without a vehicle detector installed on the inflow road of the intersection Jk.

[Outline of Data Thinning]

Figure 20:
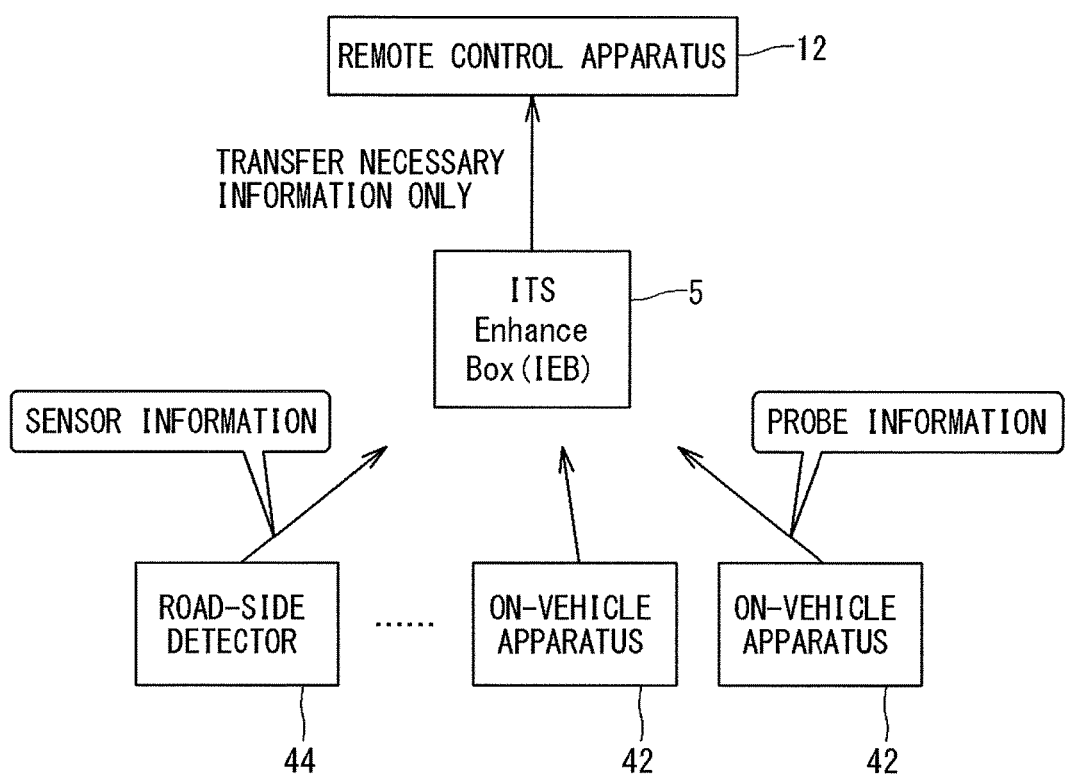
FIG. 20 is an explanatory diagram showing an outline of data thinning.

FIG. 20 is an explanatory diagram showing an outline of data thinning.

As shown in FIG. 20, the IEB 5 is able to uplink-transmit probe information received from an on-vehicle apparatus 42 and detector information received from the roadside detector 44 to the remote control apparatus 12 that performs traffic control.

In a case where probe information transmitted and received in vehicle-to-vehicle communication and detector information acquired from the roadside detector 44 are collected in the remote control apparatus 12, it is preferable for the remote control apparatus 12 to collect as many probe information and detector information as possible in order to perform more advanced traffic signal control.

However, since there are many on-vehicle apparatuses 42 in particular, if the probe information acquired by the IEB 5 is transmitted as it is to the remote control apparatus 12, the amount of data transmission in the uplink direction between the IEB 5 and the remote control apparatus 12 becomes excessive, which may result in tightening of the communication line.

Hence, the IEB 5 is able to perform a process of deleting part of data, of the probe information, excluding a header portion, in order to achieve a preset data collection rate, or a process of discarding part or all of data of a plurality of pieces of probe information without relaying the data to the remote control apparatus 12 (hereinafter referred to as "thinning process").

Thus, when the IEB 5 executes the thinning process to reduce the information to be uplinked to the remote control apparatus 12 into necessary data, tightening of the communication line connected to the remote control apparatus 12 can be suppressed.

[Outline of Advertisement Selection Control]

FIG. 21(a) is an explanatory diagram showing an outline of advertisement selection control. FIG. 21(b) is an explanatory diagram showing an example of an advertisement information management table.

As shown in FIG. 21(a), an IEB 5 installed at each intersection Jk is able to cause probe information to be broadcasted to on-vehicle communication apparatuses 42 by roadside-to-vehicle communication to include predetermined advertisement information.

In this case, the IEB 5 calculates a prediction time at which an equipped vehicle 43A will arrive at a predetermined point, on the basis of the vehicle position and the vehicle speed of the equipped vehicle 43A, signal information at the intersection Jk, and the like, and then provides, at the prediction time, the equipped vehicle 43A with advertisement information closely relating to a region including the predetermined point, whereby timely advertisement can be given to a driver of the equipped vehicle 43A.

Further, in a traffic jam, providing drivers with advertisement information that guides the drivers to commercial facilities may be effective to resolve the traffic jam.

The IEB 5 stores, for example, the advertisement information management table shown in FIG. 21(b) in the storage unit 57. Entries of the management table include data types such as advertisement ID, priority level, advertisement type, required time, etc.

IEB 5 selects advertisement information to be broadcast in order of the priority levels entered in the management table. The order of the priority levels may be changed on a time-zone basis, or may be smoothed according to the number of times of transmission.

In the advertisement selection control, a service of giving points based on regional currency to drivers may be performed in accordance with the traffic light waiting time at an intersection Jk, the amount of uplink data in probe information, and the like.

In this case, if a driver who has gained points can use the points as currency, widespread use of the on-vehicle apparatus 42 is promoted. In addition, a service may be performed in which, when an equipped vehicle 43A transmits probe information including gained points to the IEB 5, the IEB 5 executes priority control for the equipped vehicle 43A.

[Other Modifications]

It is noted that the embodiment disclosed herein is merely illustrative in all aspects and should not be recognized as being restrictive. The scope of rights of the present invention is not limited to the embodiment described above, and includes all the configurations disclosed in the scope of the claims and all modifications within an equivalent scope.

For example, in the embodiment described above, the roadside control apparatus 5 and the traffic signal controller 47 are configured as different apparatuses, the roadside control apparatus 5 may have the function of the traffic signal controller 47.

In the embodiment described above, an exemplary case has been described in which a mobile body that travels on a road is a "vehicle" having a motor. However, examples of a mobile body that travels on a road may include, in addition to a vehicle having a motor, a bicycle and the like having no motor. In the embodiment described above, when a vehicle is replaced with a mobile body, an "on-vehicle communication apparatus (on-vehicle apparatus)" may be replaced with a "mobile communication apparatus".

REFERENCE SIGNS LIST 4 public communication network
5 roadside control apparatus
12 remote control apparatus
41 traffic signal unit
42 on-vehicle communication apparatus (mobile communication apparatus)
43 vehicle
43A equipped vehicle (probe vehicle)
43B non-equipped vehicle
43G vehicle platoon
43Gx preceding vehicle
43Gy following vehicle
43S tail vehicle
43E rearmost vehicle
43E1 rearmost vehicle
43E2 rearmost vehicle
44 roadside detector
44A detection area
45 communication line
46 signal light unit
47 traffic signal controller
48 signal control line
49 portable device
51 vehicle communication unit
52 pedestrian communication unit
53 infrastructure communication unit
54 main control unit
55 DSSS control unit
56 pedestrian control unit
57 storage unit
58 vehicle receiving section
59 vehicle transmission section
60 first transmission/receiving section
61 second transmission/receiving section
Ai area

The invention claimed is:

1. A roadside control apparatus capable of wirelessly communicating with a mobile communication apparatus, comprising:
   a receiving unit configured to receive, from the mobile communication apparatus, positional information of a mobile body equipped with the mobile communication apparatus;
   a control unit configured to analyze, on a basis of the received positional information, present states of at least one of signal control and road traffic at an intersection, and generate output information based on a result of the analysis; and
   a transmission unit configured to transmit the generated output information to external equipment, wherein
   the control unit determines whether or not to extend a green interval at an inflow road of the intersection, on a basis of a driving distance by which a mobile body equipped with the mobile communication apparatus, traveling on the inflow road, drives during the green interval at the inflow road, and
   the control unit does not extend the green interval at the inflow road when the driving distance is less than a predetermined distance.

2. The roadside control apparatus according to claim 1, wherein the control unit further determines whether or not to extend the green interval at the inflow road, on a basis of a number of times of traffic light waiting, at the inflow road, of the mobile body equipped with the mobile communication apparatus.

3. The roadside control apparatus according to claim 2, wherein the control unit extends the green interval at the inflow road, in a case where the driving distance is greater than or equal to the predetermined distance and the number of times of traffic light waiting is greater than or equal to a predetermined number of times.

4. The roadside control apparatus according to claim 1, wherein
   the control unit estimates a number of in-zone equipped mobile bodies which is a number of mobile bodies equipped with the mobile communication apparatus, that are existing in a measurement zone in the inflow road of the intersection, and estimates a total number of in-zone mobile bodies which is a number of all mobile bodies existing in the measurement zone, and
   the control unit divides the number of in-zone equipped mobile bodies by the total number of in-zone mobile bodies to calculate an equipping rate of the mobile communication apparatus.

5. The roadside control apparatus according to claim 4, wherein
   the control unit sets, as an upstream end of the measurement zone, a stop position of one mobile body among one or a plurality of mobile bodies equipped with the mobile communication apparatus, the mobile bodies waiting for a traffic light to change at the intersection.

6. The roadside control apparatus according to claim 4, wherein
   the control unit sets, as an upstream end of the measurement zone, a predetermined position on a downstream side of a stop position of one mobile body among one or a plurality of mobile bodies equipped with the mobile communication apparatus, the mobile bodies waiting for a traffic light to change at the intersection.

7. The roadside control apparatus according to claim 1, wherein
the control unit transmits a convoy delimiting command for separating a mobile body platoon that is composed of a plurality of mobile bodies equipped with the mobile communication apparatus and is traveling in a convoy, into a platoon of preceding vehicles that can pass through the intersection at a green light this time and a platoon of following vehicles that cannot pass through the intersection at the green light this time, to the mobile communication apparatus of the mobile body platoon.

8. The roadside control apparatus according to claim 7, wherein
the control unit determines whether or not to transmit the convoy delimiting command, on a basis of a traffic light switching timing at the inflow road of the intersection, and positions of a lead mobile body and a rearmost mobile body in the mobile body platoon.

9. The roadside control apparatus according to claim 8, wherein
the control unit transmits the convoy delimiting command in a case where the rearmost mobile body in the mobile body platoon cannot pass through the intersection by a green-light end time at the inflow road.

10. The roadside control apparatus according to claim 7, wherein
the control unit transmits the convoy delimiting command in a case where only a part of mobile bodies in the mobile body platoon can pass through the intersection because of an exit-blocking jam that has occurred on an exit road of the intersection.

11. The roadside control apparatus according to claim 10, wherein
the control unit generates information capable of specifying a delimitation position between the preceding vehicles and the following vehicles, in accordance with a length of an empty space that exists on an upstream side of the exit-blocking jam on the exit road, and causes the convoy delimiting command to include the generated information.

12. A non-transitory computer readable storage medium storing a computer program for causing a computer to function as a roadside control apparatus capable of wirelessly communicating with a mobile communication apparatus, the computer program including:
a step of causing a receiving unit of the roadside control apparatus to receive, from the mobile communication apparatus, positional information of a mobile body equipped with the mobile communication apparatus;
a step of causing a control unit of the roadside control apparatus to analyze, on a basis of the received positional information, present states of at least one of signal control and road traffic at an intersection, and generate output information based on a result of the analysis; and
a step of causing a transmission unit of the roadside control apparatus to transmit the generated output information to external equipment, wherein
in the step of causing the control unit to analyze, the control unit determines whether or not to extend a green interval at an inflow road of the intersection, on a basis of a driving distance by which a mobile body equipped with the mobile communication apparatus, traveling on the inflow road, drives during the green interval at the inflow road, and
the control unit does not extend the green interval at the inflow road when the driving distance is less than a predetermined distance.

13. An information processing method executed by a roadside control apparatus capable of wirelessly communicating with a mobile communication apparatus, the method including:
a step of causing a receiving unit of the roadside control apparatus to receive, from the mobile communication apparatus, positional information of a mobile body equipped with the mobile communication apparatus;
a step of causing a control unit of the roadside control apparatus to analyze, on a basis of the received positional information, present states of at least one of signal control and road traffic at an intersection, and generate output information based on a result of the analysis; and
a step of causing a transmission unit of the roadside control apparatus to transmit the generated output information to external equipment, wherein
in the step of causing the control unit to analyze, the control unit determines whether or not to extend a green interval at an inflow road of the intersection, on a basis of a driving distance by which a mobile body equipped with the mobile communication apparatus, traveling on the inflow road, drives during the green interval at the inflow road, and
the control unit does not extend the green interval at the inflow road when the driving distance is less than a predetermined distance.

* * * * *